United States Patent [19]

Broughton et al.

[11] Patent Number: 4,814,967

[45] Date of Patent: Mar. 21, 1989

[54] DIGITALLY-CONTROLLED CYCLOCONVERTER

[76] Inventors: M. Blythe Broughton, P.O. Box 346, R.R. 2, Kingston, Ontario, Canada, K7L 5H6; Michael J. Adams, 46B Medhurst Drive, Nepean, Ontario, Canada

[21] Appl. No.: 171,433

[22] Filed: Mar. 21, 1988

[30] Foreign Application Priority Data

Jun. 23, 1987 [CA] Canada .................................. 540352

[51] Int. Cl.[4] ............................................. H02M 5/257
[52] U.S. Cl. ........................................ 363/160; 363/10
[58] Field of Search ................... 363/10, 159, 160, 164, 363/165

[56] References Cited

U.S. PATENT DOCUMENTS

| | | | |
|---|---|---|---|
| 4,317,975 | 3/1982 | Mizukawa et al. | 363/160 |
| 4,349,867 | 9/1982 | Otsuka et al. | 363/164 |
| 4,658,346 | 4/1987 | Templeton | 363/160 |

Primary Examiner—Patrick R. Salce
Assistant Examiner—Jeffrey Sterrett
Attorney, Agent, or Firm—Bradford E. Kile

[57] ABSTRACT

A digitally-controlled cycloconverter converts a multiple-phase power signal of variable frequency into a single-phase or multiple-phase signal of a lower selected frequency. The cosinusoidal algorithm is utilized to determine the firing delay times, with the analog reference wave used in that algorithm being created from a digitized hardware table. The cosinusoidal algorithm is further simplified by defining the relationship between the analog reference wave and the cosinusoidal timing waves in terms of a two-part piecewise linear relationship which is incorporated into a digital algorithm. The digital algorithm is implemented on a system employing a high-power microprocessor having hardware multiplication and division capability, allowing the algorithm to be used with supply voltages having frequencies about those previously used for cycloconversion. The control logic involved with the firing of a series of thyristors is simplified by utilizing pulse transformers.

14 Claims, 18 Drawing Sheets

TIMING PERIOD (TP) = WIDTH OF THE TIMING PULSE

DIGITALLY-CONTROLLED CYCLOCONVERTER

This invention relates to a cycloconverter for converting a power signal of variable frequency into a power signal of a lower selected frequency, and more particularly, to a digitally-controlled cycloconverter for converting a multiple-phase signal of variable frequency into a single-phase or multiple-phase signal of a lower selected frequency.

'Cycloconversion' is a term introduced into electrical engineering in the 1930's to describe a particular variation of the process by which a voltage waveform is fabricated from segments of another multiple-phase voltage waveform of higher frequency, the variation using line, or natural, commutation of the higher frequency voltage rather than 'forced commutation'. Present cycloconversion systems usually use thyristors to gate segments of the voltage differentials that exist between the input voltage waveforms. An important consideration in the design of a cycloconverter system is the manner in which appropriate delay times can be created between the sensing of the voltage differentials between input voltage waveforms and the 'firing' of the thyristors associated with those voltage differentials. The firing times of the thyristors determine which portions of the voltage differentials will form the output voltage wave, and those times thereby dictate the shape and frequency of the output wave.

One of two basic firing algorithms, the cosinusoidal and integral algorithms, is usually employed to determine the firing delay times. The cosinusoidal algorithm, a form of which is utilized in this invention, relates the sequence of the firing of the thyristors to the intersection points of a series of cosinusoidal timing waves derived from the supply voltage with an analog reference wave representing the desired output. With the cosinusoidal algorithm, only the amplitude of the reference wave normally determines the amplitude of the output wave; the algorithm compensates for changes in the amplitude of the supply voltage, and thus the cosinusoidal timing waves, in such a way that such changes have no effect on the output amplitude. The subject invention dispenses with the need for an analog reference wave, and in its place utilizes a digitized 'hardware table'. The resultant fully digital version of the cosinusoidal firing algorithm has none of the drawbacks of the analog version of the algorithm, which include the need to generate the analog wave and the need for sampling and A/D conversion of that wave. The subject invention also simplifies the cosinusoidal firing algorithm by defining the relationship between the reference wave and the cosinusoidal timing waves in terms of a two-part piecewise linear relationship which can be easily incorporated into a digital algorithm. The digital algorithm is implemented on a system employing a high-power microprocessor having hardware multiplication and division capability; the algorithm may thereby be used with supply voltages having frequencies above those previously used. A further advantage of the subject invention relates to the firing circuit used for the thyristors. It utilizes a novel implementation of pulse transformers to apply the firing pulses to the respective thyristors; this simplifies the required firing control logic.

The scope of the subject invention will be more full explained by means of the following drawings, in which.

Figure 1:
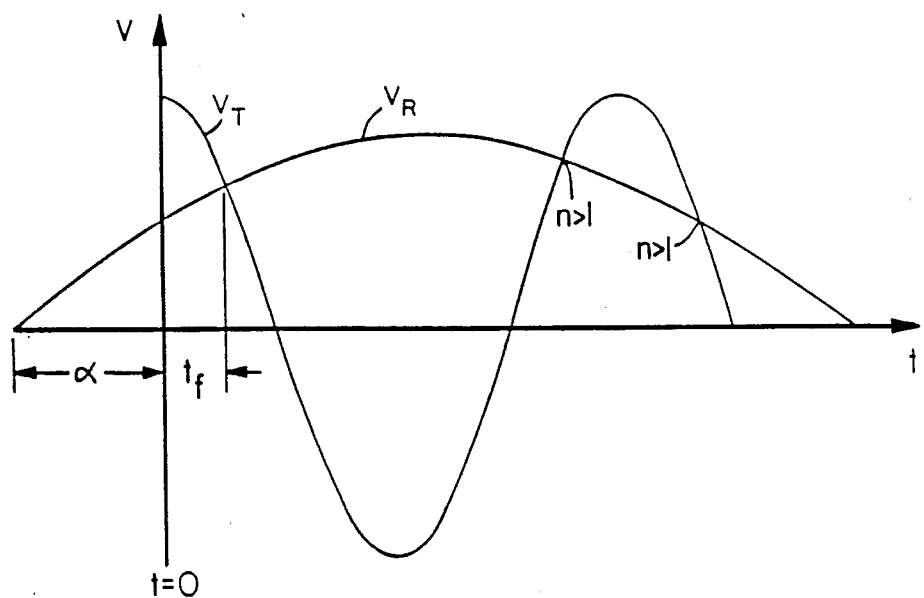
FIG. 1 illustrates the general relationship between the waveforms involved with the cosinusoidal algorithm, the analog reference waveform and one of the cosinusoidal timing waveforms being illustrated.

With reference to FIG. 1, the analog reference voltage waveform $V_R$ and a cosinusoidal timing waveform $V_t$ are illustrated. The period of the timing waveform decreases as the frequency of the input voltage waveform increases, as will be further discussed. A cycloconverter utilizes a sequence of such timing waveforms, each offset in time from the adjacent timing waveforms by the same timing period. As an example, the timing period for the 6-pulse bridge-connected cycloconverter illustrated in FIG. 2 and further discussed in the preferred embodiment is equal to one-sixth of the period of any of the supply voltage waveforms, $V_A$, $V_B$, and $V_C$.

The analog reference voltage can be written as:

$$V_R = V \sin(w_o t + \alpha),\quad \text{Equation 1}$$

where
V = peak reference voltage,
$w_o = 360 \cdot f_o$, $f_o$ = output frequency, and
$\alpha$ = the delay angle, i.e. the angle between the start of the reference wave and the start of the timing wave.

The timing voltage can be written as:

$$V_T = V \cos(w_i t),\quad \text{Equation 2}$$

where
$w_i = 360 \cdot f_i$, $f_i$ = supply frequency.

If $t=0$ is defined as the time at which the thyristors become forward biased, i.e. first capable of being fired, then the firing delay is determined from the relationship that $V_R = V_T$. Then:

$$V \sin(w_o t_f + \alpha) = V \cos(w_i t_f),$$

$$\cos(w_o t_f + \alpha - 90) = \cos(w_i t_f),$$

$$(w_o t_f) + \alpha - 90 = ((-1)^n)\cdot(w_i)\cdot(t_f) + (n \cdot 360),$$

$$(w_o - ((-1)^n)\cdot w_i)\cdot t_f = 90 - \alpha + (n \cdot 360),$$

$$t_f = (90 - \alpha + (n \cdot 360))/(w_o - ((-1)^n)\cdot w_i)\quad \text{Equation 3}$$

Equation 3 is the fundamental equation for calculating the required firing delay. The 'n' in Equation 3 is due to the periodic function of Equations 1 and 2. Only the first intersection between $V_R$ and $V_T$ need be considered, i.e. only the first even (n=0) and odd (n=1) integer values.

If equation 3 is differentiated with respect to $\alpha$, the relationship is obtained between a change in the firing delay and a unit change in $\alpha$:

$$\frac{dt_f}{d\alpha} = \frac{-1}{(w_o - ((-1)^n)\cdot w_i)}\quad \text{Equation 4}$$

which is constant for any $w_o$ not equal to $w_i$. This is a valid restriction, since the operating limits for a cycloconverter do not permit the ratio of $w_o/w_i$ to exceed one-third.

Equation 4 illustrates that there exists a linear relationship between the firing delay and the incremental change in $\alpha$ for constant $w_o$ and $w_i$. The two linear solutions of Equation 4 are:

$$\frac{dt_f}{d\alpha} = \frac{1}{\frac{(w_i)\cdot(1 - w_o)}{w_i}} \text{ for } n = 0\quad \text{Equation 5}$$

and, $$\frac{dt_f}{d\alpha} = \frac{-1}{\frac{(w_i)\cdot(w_o + 1)}{w_i}} \text{ for } n = 1\quad \text{Equation 6}$$

Figure 3:
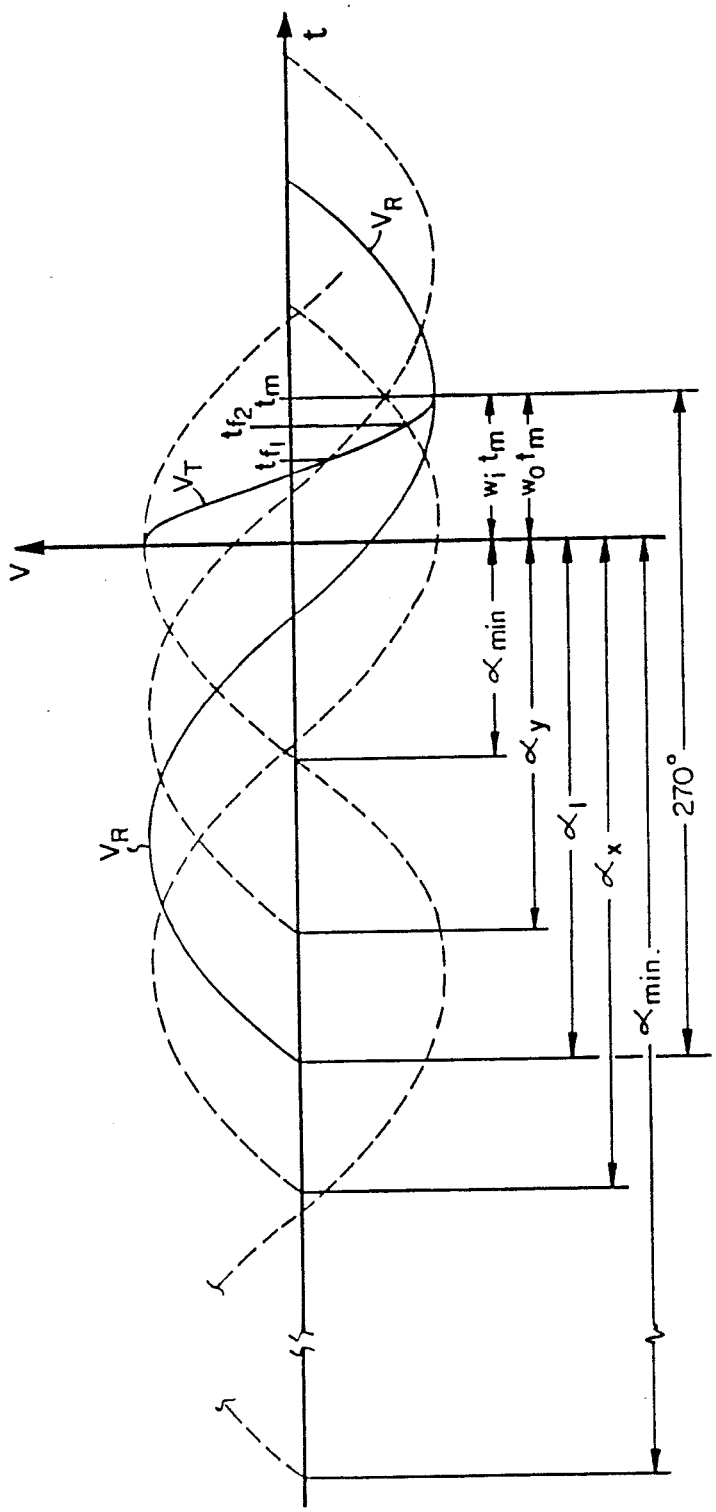
FIG. 3 illustrates the relationship between the analog reference waveform and the cosinusoidal timing waveform for a given output-to-input voltage frequency ratio.

With reference to FIG. 3, the maximum firing delay, $t_m$, occurs at the intersection between $V_R$ and $V_T$ when the timing and reference waves are at their minimum. If $\alpha$ in that situation is given the value $\alpha_1$, then:

$$w_i t_m = 180°\quad \text{Equation 7}$$

and, $$w_o t_m + \alpha_1 = 270°\quad \text{Equation 8}$$

Equations 7 and 8 yield:

$$t_m = \frac{180°}{w_i} = \frac{(270° - \alpha_1)}{w_o}\quad \text{Equation 9}$$

and, $$\alpha_1 = 270° - (180)\cdot\frac{w_o}{w_i}\quad \text{Equation 10}$$

Figure 4:
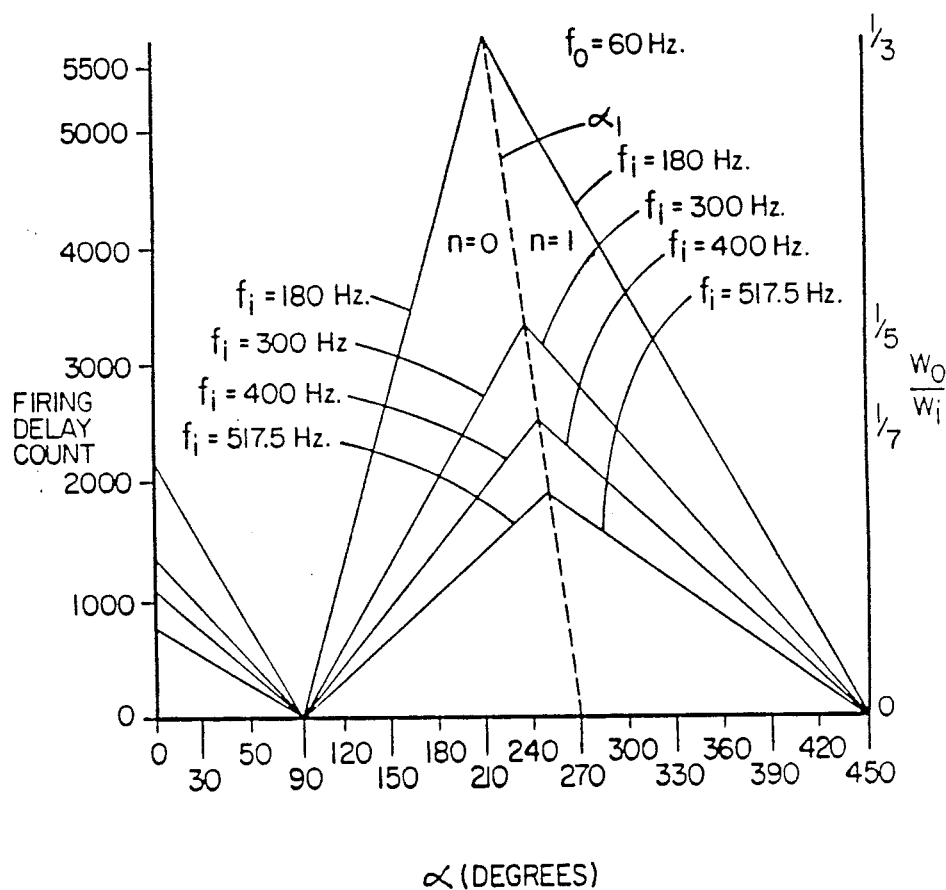
FIG. 4 illustrates the variation of the maximum delay angle with the output-to-input voltage frequency ratio.

FIG. 3 also illustrates that the minimum firing delay, i.e. a firing delay of zero, will occur at an $\alpha$ value of 90°, while a maximum firing delay, $t_m$, will occur at an $\alpha$ value of $\alpha_1$ (where $\alpha_1 + w_o t_m = 270°$). Also shown in outline in FIG. 3 are two variations in relative position between the analog reference waveform $V_R$ and the cosinusoidal timing waveform $V_T$, $\alpha_x$ being greater than $\alpha_1$ by the same amount that $\alpha_y$ is less than $\alpha_1$. The variations in the $V_R$ waveform intersect the $V_T$ waveform at times $t_{f1}$ and $t_{f2}$, as shown in FIG. 3. As the $V_T$ and $V_R$ waveforms move relative to each other, $V_R$ intersects $V_T$ along the 180° portion of $V_T$ shown in FIG. 3. A projection of the intersection point onto the time axis defines the firing delay, that delay continuously reciprocating between the value zero and the maximum firing delay $t_m$. FIG. 4 was created using the relationship expressed in FIG. 3 and values derived from Equation 10. The slope of the lines in the n=0 and n=1 regions are drawn as straight lines in agreement with the results of Equations 5 and 6. For a $w_o/w_i$ ratio of ⅓, Equations 5 and 6 predict that the slope in the n=1 region should be one-half as steep and of opposite sign to that shown in the n=0 region; the two lines denoted by $f_i = 180$ Hz. in FIG. 4 verify that relationship.

If the firing delay, $t_f$, is defined as the time between when the thyristors are capable of being fired (the peak of $V_T$ shown at time zero in FIG. 3) and the time when they are actually fired, $t_f$ can be related to the maximum firing delay $t_m$ for any given $w_o/w_i$ ratio through the geometry of FIG. 4. For $\alpha$ less than $\alpha_1$ but greater than 90°, the following equation is derived:

$$t_f = t_m \cdot \frac{(\alpha - 90°)}{(\alpha_1 - 90°)}\quad \text{Equation 11}$$

Similarily, for $\alpha$ greater than $\alpha_1$ but less than 450°, the following equation is derived:

$$t_f = t_m \cdot \frac{(450° - \alpha)}{(450° - \alpha_1)}\quad \text{Equation 12}$$

Since $\alpha_1$ is a function of $w_o$ and $w_i$ only, $\alpha_1$ can be calculated for any output/input frequency ratio. A digital counter circuit driven at a frequency proportional to the selected output frequency can be used to provide instantaneous values of $\alpha$; this counter circuit in effect replaces the analog reference wave earlier discussed. A comparator circuit can be used to create voltage differential waveforms that vary in frequency with the supply voltage waveforms. The time differential between successive voltage differential waveforms is used to calculate a value of $t_m$. Using the calculated value of $t_m$ and the instantaneous value of $\alpha$, one of Equations 11 and 12 is used to calculate $t_f$. That calculated firing delay is then fed to the gates of corresponding thyristors allowing creation of the desired output voltage waveforms from segments of the voltage differentials between the input voltage waveforms.

In a first form, the invention is a digitally-controlled cycloconverter system for transforming a multiple-phase input power signal of variable frequency into a single-phase output power signal of a selected lower frequency. The cycloconverter system is comprised of sensor means, comparator means, free-running counter means, processing means, and signal gate means. The sensor means is connected to the input power signal, and the comparator means is connected to the sensor means for continuously creating from the input power signal a series of voltage differential waveforms. Each voltage differential waveform varies with a respective one of the voltage differentials existing between different pairs of the voltage waveforms of the input power signal. The time during which one of the voltage differential waveforms is of greater positive magnitude than the other voltage differential waveforms is defined as the associated timing period of the voltage differential represented by the one of the voltage differential waveforms. The number of timing periods is thereby equal to twice the number of voltage waveforms of the input power signal. The free-running counter means continuously cycles through a defined count at a rate proportional to the selected frequency of the output power signal. The processing means calculates during each timing period a firing delay for the following timing period, the calculation of each firing delay utilizing the length of the timing period and a count taken from the free-running counter means. The signal gate means creates the output power signal by passing segments of the voltage differentials existing between voltage waveforms of the input power signal. The signal gate means opens to define the start of each voltage differential segment at a time delayed from the start of the timing period associated with that voltage differential by the firing delay calculated by the processing means during the preceding timing period. The signal gate means closes to define the end of that segment at a time delayed from the start of the timing period associated with the following voltage differential by the following firing delay.

A second form of the invention is similar to that just described except that the multiple-phase input power signal is transformed into a multiple-phase output power signal. In this form of the invention, the sensor means, comparator means and free-running counter means are identical to those in the first form of the invention. However, in this form of the invention the processing means calculates a firing delay for the following timing period for each voltage waveform of the output power signal. Also, in this form of the invention each voltage waveform of the output power signal requires its own signal gate means.

In the first or second form of the invention, the multiple-phase input power signal may have three voltage waveforms, from which are created six voltage differential waveforms and six associated timing periods. The multiple-phase output power signal may have three output voltage waveforms. The signal gate means may be comprised of thyristors.

The free-running counter means may be comprised of a first counter and a second counter. In such arrangement, the first counter counts the pulses of a system clock and the second counter counts the number of output signals from the first counter. The first counter produces one such output signal each time the first counter concludes a count cycle, the length of each such count cycle being proportional to the selected frequency of the output power signal. The count utilized for calculating each firing delay is an instantaneous value of the count in the second counter.

After the firing delay, a firing pulse may be fed from the processing means to two signal gates of the signal gate means through a transformer circuit. The transformer circuit comprises a series of transformers each having two input windings and a single output winding. Each firing pulse is fired through two serially-connected input windings, one of those input windings being on a first transformer and the other of those input windings being on a second transformer. The output winding of the first transformer is connected to the trigger input of a first signal gate and the output winding of the second transformer is connected to the trigger input of a second signal gate. The first and second signal gates are thereby simultaneously fired after the same firing delay.

A further form of the invention is a method for transforming a multiple-phase input power signal of variable frequency into a single-phase output power signal of a selected lower frequency. The method comprises the initial steps of continuously sensing the input power signal and continuously creating from the input power signal a series of voltage differential waveforms. Each voltage differential waveform varies with a respective one of the voltage differentials existing between different pairs of the voltage waveforms of the input power signal. The time during which one of the voltage differential waveforms is of greater positive magnitude than the other voltage differential waveforms is defined as the associated timing period of the voltage differential represented by the one of the voltage differential waveforms. The number of timing periods is thereby equal to twice the number of the voltage waveforms of the input power signal. The next step of the method comprises the step of calculating, during each cycle of the input power signal, a maximum firing delay equal to 180 degrees divided by the frequency of the input power signal. The following step involves calculating, during each cycle of the input power signal, a maximum firing delay angle equal to 270 degrees minus the product obtained by multiplying 180 degrees by the ratio of the frequency of the output power signal to the frequency of the input power signal. In this step, as well as in the preceding step, the input power signal frequency is determined from the length of one of the timing periods of the cycle. Next, during each timing period, an instantaneous value of a count from a free-running counter cycling continuously between a low value equivalent to 90 degrees and a high value equivalent to 450 degrees is obtained. The next step involves calculating, during each timing period, an equivalent angular value for each count value obtained during that timing period. The next step involves determining, during each timing period, whether the equivalent angular value calculated during that timing period is greater or less than the maximum firing delay angle of the cycle. If the angular value is greater then a first fraction is calculated equal to quotient obtained by dividing the angular value minus 90 degrees by the maximum firing delay angle minus 90 degrees. If the angular value is less, then a second fraction is calculated equal to the quotient obtained by dividing 450 degrees minus the angular value by 450 degrees minus the maximum firing delay angle. The next step involves calculating, during each timing period, a firing delay equal to the product of the maximum firing delay of the cycle and the applicable first or second fraction determined during that timing period. The final step involves triggering, during each timing period, a signal gate means for creating the output power signal by passing segments of the voltage differentials existing between the voltage waveforms of the input power signal. The signal gate means opens to define the start of each voltage differential segment at a time delayed from the start of the timing period asssociated with that voltage differential by the firing delay calculated during the preceding timing period. The signal gate means closes to define the end of that segment at a time delayed from the start of the timing period associated with the following voltage differential by the following firing delay.

A still further form of the invention is a method similar to that just described, except that the output power signal is multiple-phased. This form of the invention differs from that just described in that an angular value is calculated from the count value for each voltage waveform of the output power signal. Also, the determination as to whether the angular value is greater or less than the maximum firing delay angle is made for each voltage waveform of the output power signal. The steps of calculating a firing delay and triggering a signal gate means are also made for each voltage waveform of the output power signal.

The foregoing method may include the additional step, prior to obtaining the count value from the free-running counter means, of dividing the input to the counter by a predetermined factor if the frequency of the input power signal is less than a predetermined minimum value.

The signal gate means may be comprised of a series of thyristors. The multiple-phase input power signal may have three voltage waveforms, from which are created six voltage differential waveforms and six associated timing periods. The output power signal may have three voltage waveforms. The counter may continuously cycle between a low value of 360 and a high value of 1800.

Figure 5:
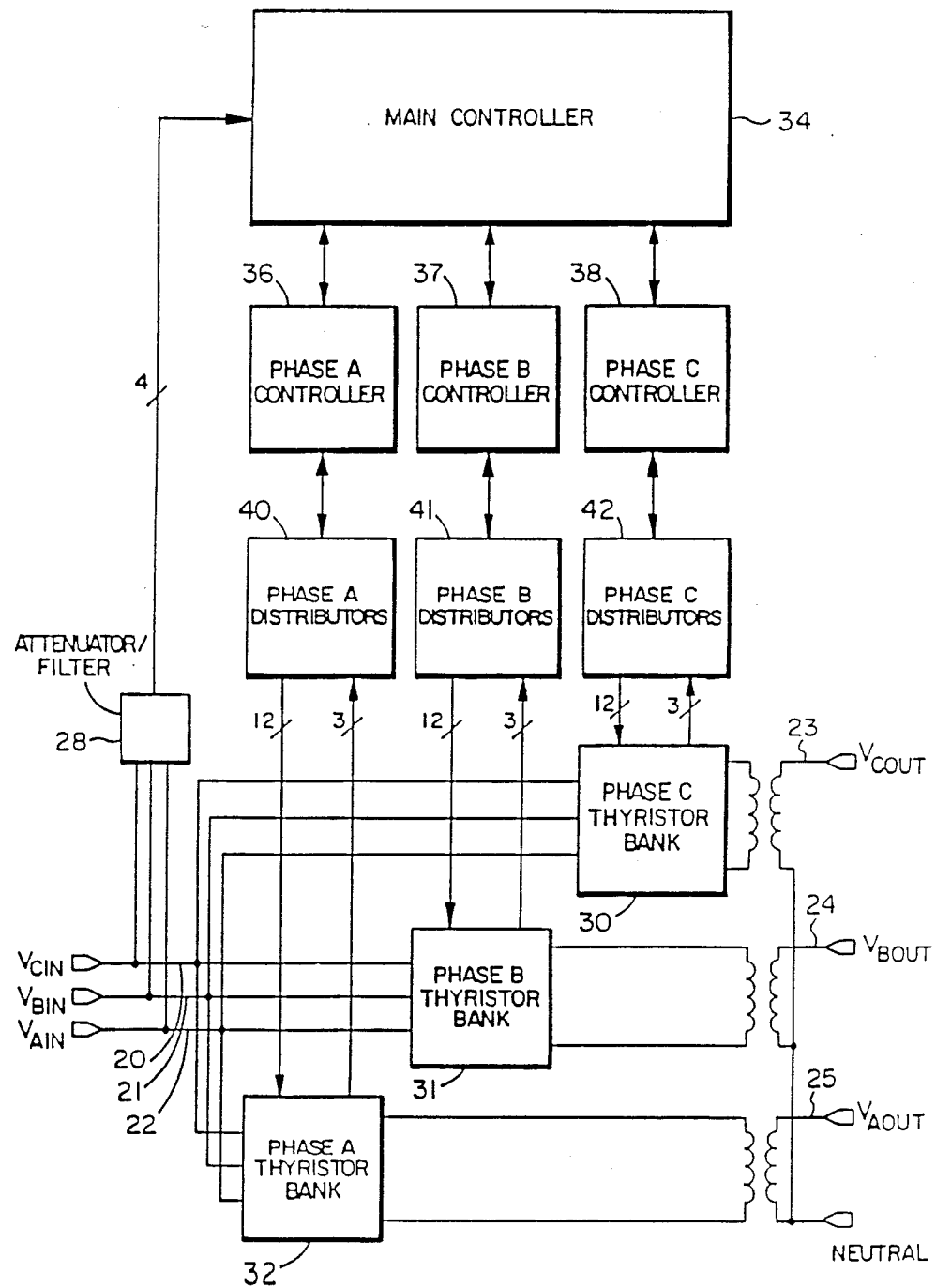
FIG. 5 is a schematic diagram of the overall cycloconverter system of the preferred embodiment.

With reference to FIG. 5, the cycloconverter system of the preferred embodiment is designed to convert the variable frequency 3-phase supply voltage $V_{AIN}$, $V_{BIN}$, and $V_{CIN}$, on lines 20, 21 and 22, respectively, to the 3-phase lower frequency output voltage $V_{AOUT}$, $V_{BOUT}$, and $V_{COUT}$ on lines 23, 24 and 25, respectively. Attenuator and active filter arrangement 28 reduces the supply voltage values to within the +15 to −15 volt range of the sensing circuits of the system. It also filters the noise caused by the firing of the associated thyristor banks, 30, 31 and 32, to prevent noise spikes from those banks from creating interference. The active filter of arrangement 28 is a unity-gain Sallen-Key second-order low-pass circuit with a 500 Hz. cut-off frequency. Main controller unit 34 receives the attentuated and filtered representation of the supply voltage, and utilizes those signals and a digitally-constructed reference wave based on the selected output frequency to determine the magnitude of firing delays transmitted to each of three phase controllers, 36, 37 and 38. Each of the phase controllers is connected to an associated one of three phase distribution units, 40, 41 and 42, each of which utilizes an arrangement of pulse transformers for firing a sequence of connected pairs of thyristors in the associated thyristor bank.

Figure 6:
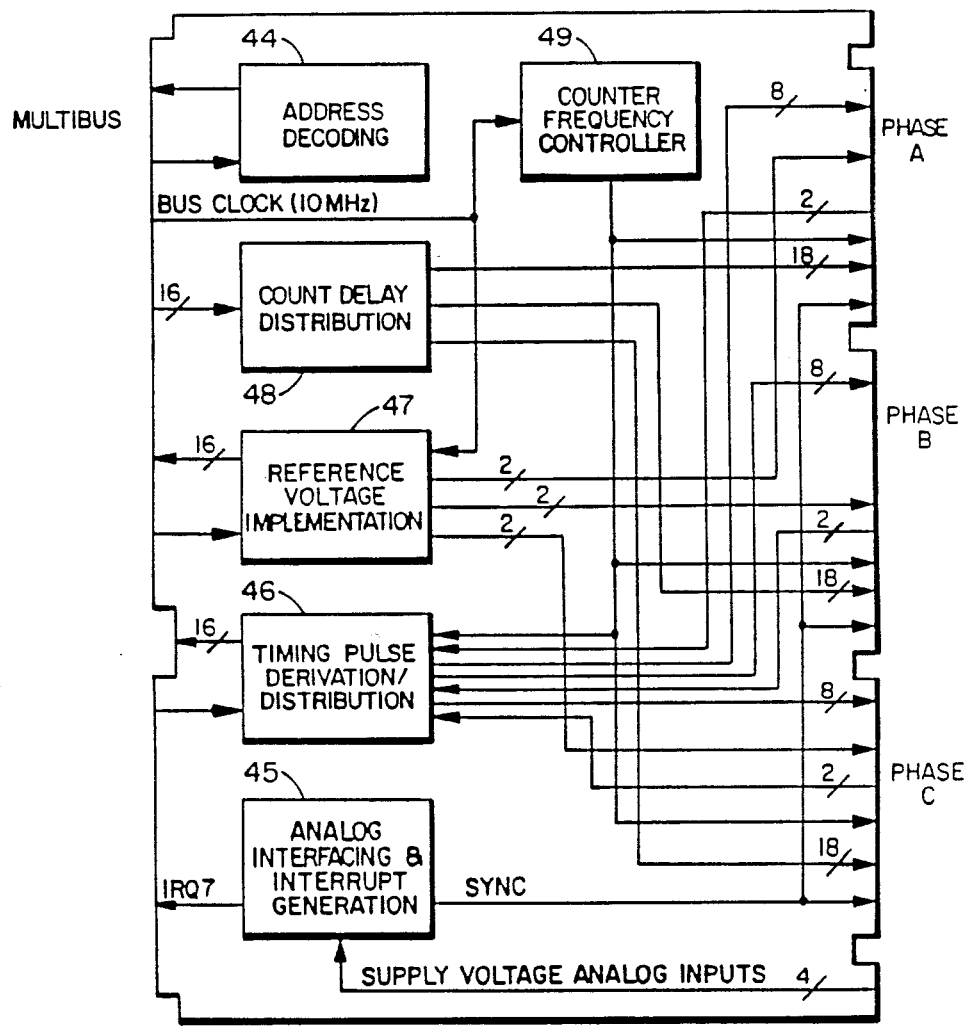
FIG. 6 is a schematic diagram of the interface board used by the main controller of the cycloconverter system.

FIG. 6 is a schematic diagram illustrating the functional elements of the interface board of main controller unit 34. Those elements include an address decoding unit 44, an analog interfacing and interrupt generation unit 45, a timing pulse derivation/distribution unit 46, a reference voltage creation unit 47, a delay count distribution unit 48, and a counter frequency controller unit 49. For reasons that will become evident, the cycloconverter system of this invention requires a microprocessor with 16-bit hardware multiplication and division capability; main controller unit 34 was therefore implemented by means of an Omnibyte TM single-board computer utilizing the Motorola 68000 TM 16-bit microprocessor and Hemenway TM operating system, although any computer system of equivalent capability could be utilized.

Figure 7:
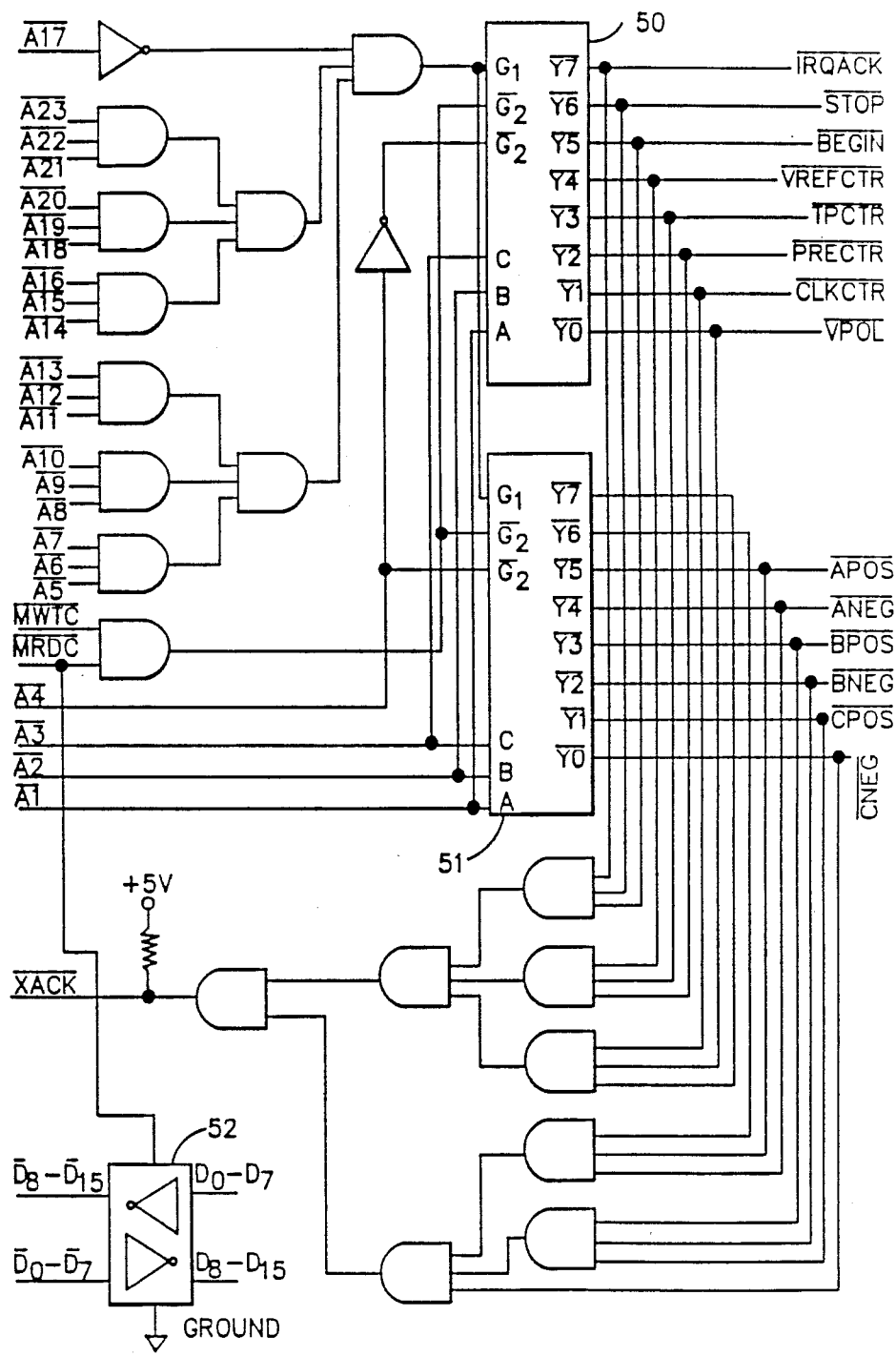
FIG. 7 is a schematic diagram of the address decoding portion of the main controller interface board.

The circuitry of address decoding unit 44 is illustrated in FIG. 7. As shown, decoding unit 44 produces 14 control signals by decoding 19 of the 24 address lines of the 68000. The function of the 14 control signals is summarized in Table I. Elements 50 and 51 are 74LS138 3-to-8 decoders. Element 52 is a 16-bit bidirectional buffer for buffering data transfer to the interface board, the MRDC control signal of the 68000 controlling the buffer. Communication between the 68000 single-board computer and the interface board of main controller unit 34 is by means of the MULTIBUS TM bus system of Intel Corporation, bus signals on the MULTIBUS TM being inverted. Because the 68000 and the MULTIBUS TM are asynchronous systems, the interface board is responsible for all bus control logic. This requires that all accesses to the interface board by the 68000 be acknowledged by the interface board, XACK being the acknowledgment signal transmitted to the 68000. In its present configuration, the interface board is always 'on-the-bus' since data buffer 52 is enabled independently of the address lines. This creates no difficulty with the configuration utilized since the interface board is the only board communicating with the 68000 on the MULTIBUS TM; if another board were placed onto the MULTIBUS TM, however, address lines would have to be incorporated into the enable signal of data buffer 52.

Figure 8:
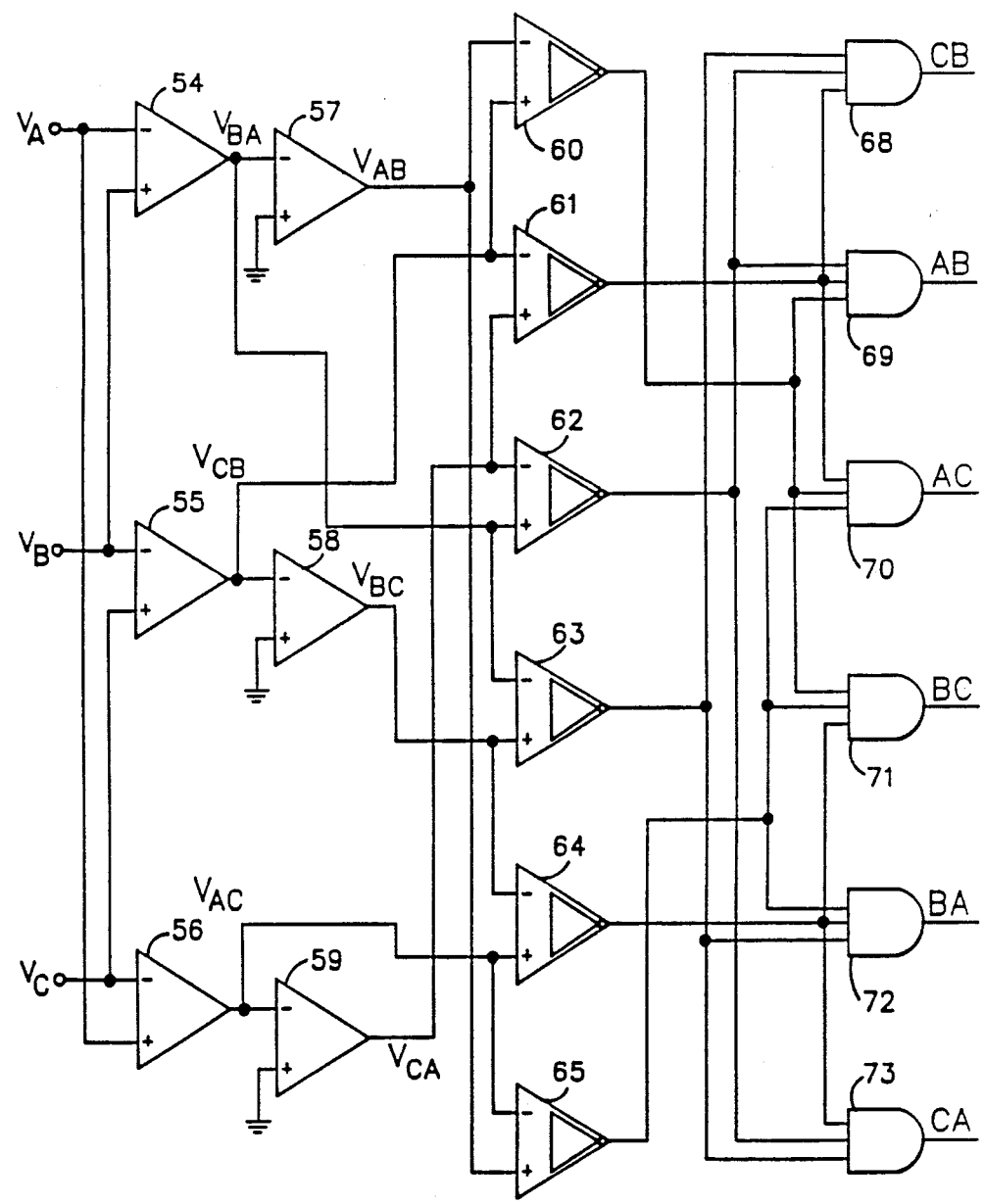
FIG. 8 is a schematic diagram of the analog interface portion of the main controller interface board.
Figure 9:
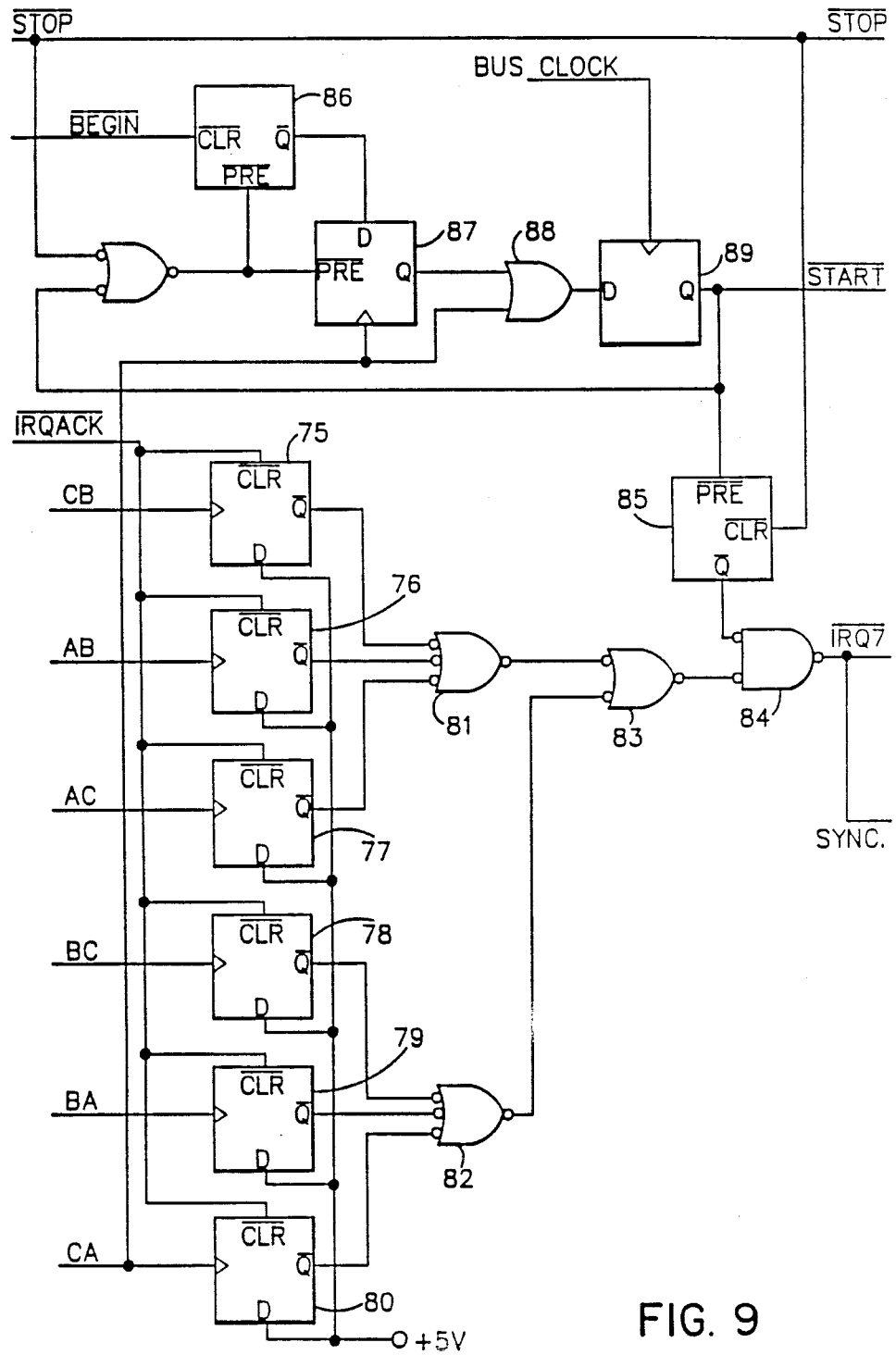
FIG. 9 is a schematic diagram of the interrupt generation portion of the main controller interface board.
Figure 10:
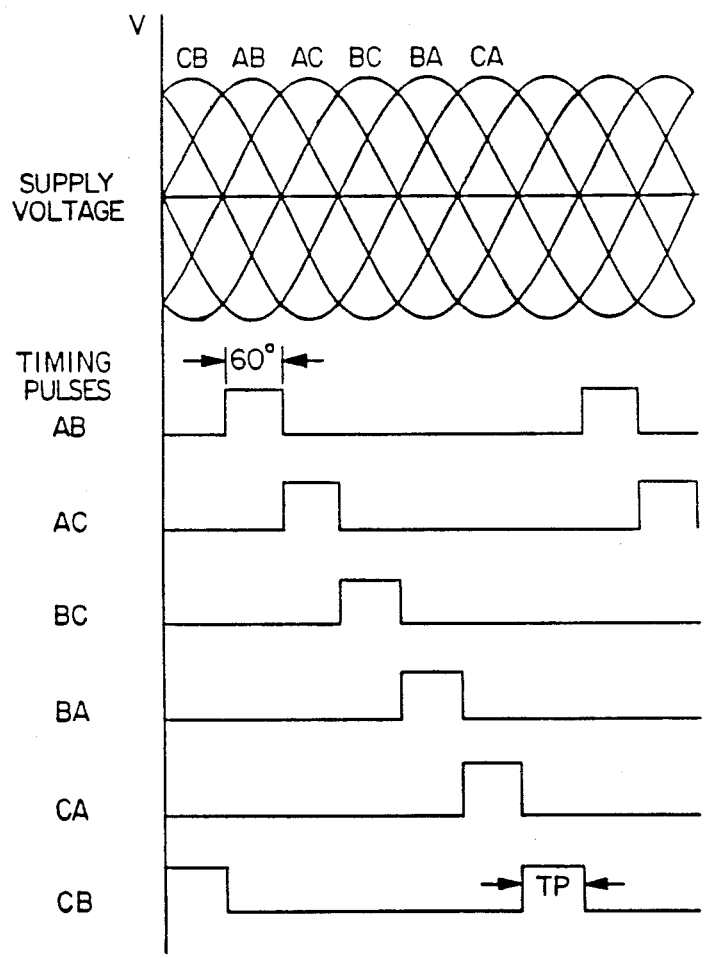
FIG. 10 is an illustration of the six timing pulses created by the analog interface portion of the main controller interface board.

The components of analog interfacing and interrupt generation unit 45 are demonstrated in FIGS. 8 and 9. With regard to analog interfacing shown in FIG. 8, the operational amplifiers 54 to 59 produce six differential waveforms $V_{BA}$, $V_{CB}$, $V_{AC}$, $V_{AB}$, $V_{BC}$ and $V_{CA}$, respectively, from the attenuated and filtered representation of the supply voltage. Each of the six comparator/TTL converters 60 to 65 then continuously compares a respective pair of the six differential waveforms. Each of the 3-input NAND gates 68 to 73 then goes high when three of the comparator/TTL converters 60 to 65 are simultaneously high. For instance, NAND gate 69 goes high only when $V_{CB}$ is greater than $V_{AB}$, and $V_{CA}$ is greater than $V_{CB}$, and $V_{BA}$ is greater than $V_{CA}$. Each of the NAND gates 68 to 73 remains high for one Timing Period, as illustrated in FIG. 10.

Interrupt generation utilizing the six Timing Periods produced by the analog interfacing circuit of FIG. 8 is disclosed in FIG. 9. The Timing Periods are used as clock inputs to six D-type flip-flops, 75 to 80, and are used to generate interrupts. The flip-flops are reset by the IRQACK control signal. The interrupts are gated by an arrangement consisting of gates 81 to 84 and flip-flop 85 to the Level 7 interrupt line on the MUL- TIBUS ™ and to the SYNC control signal used by the phase controllers 36, 37 and 38. The interrupts are active low, and if flip-flop 85 is set high the generated interrupts are blocked by gate 84. Two of the control signals described in Table I, START and STOP, control access of the generated interrupts to the interrupt bus line. When enabled by the START command, an IRQ7/SYNC pulse is generated at the start of every Timing Period; this maintains the overall system in synchronization with variations in the supply frequency. A second function of the timing pulses is to synchronize the start sequence. To start the cycloconverter, BEGIN is asserted low by decoding of the 68000 address signals. That step clears flip-flop 86, which presents a low signal to the input of flip-flop 87. That low signal, which is then transferred to OR gate 88 by the rising edge of the CA timing pulse, is one of the two low inputs required at OR gate 88 for initiating the start sequence. Without this arrangement, the cycloconverter system could be started in the middle of the timing pulse and there would be insufficient time to complete algorithm execution. The falling edge of the CA pulse is concurrent with the start of the CB Timing Period, and puts the output of OR gate 88 low, enabling flip-flop 89 to generate the start pulse, START. START allows the interrupts to access the Level 7 Interrupt on the MULTIBUS ™, as well as being used by the phase controllers. The third function of the timing pulses is the control of the Timing Period Counter on the timing pulse derivation and distribution portion of the main controller interface board, as will be described next.

Figure 11:
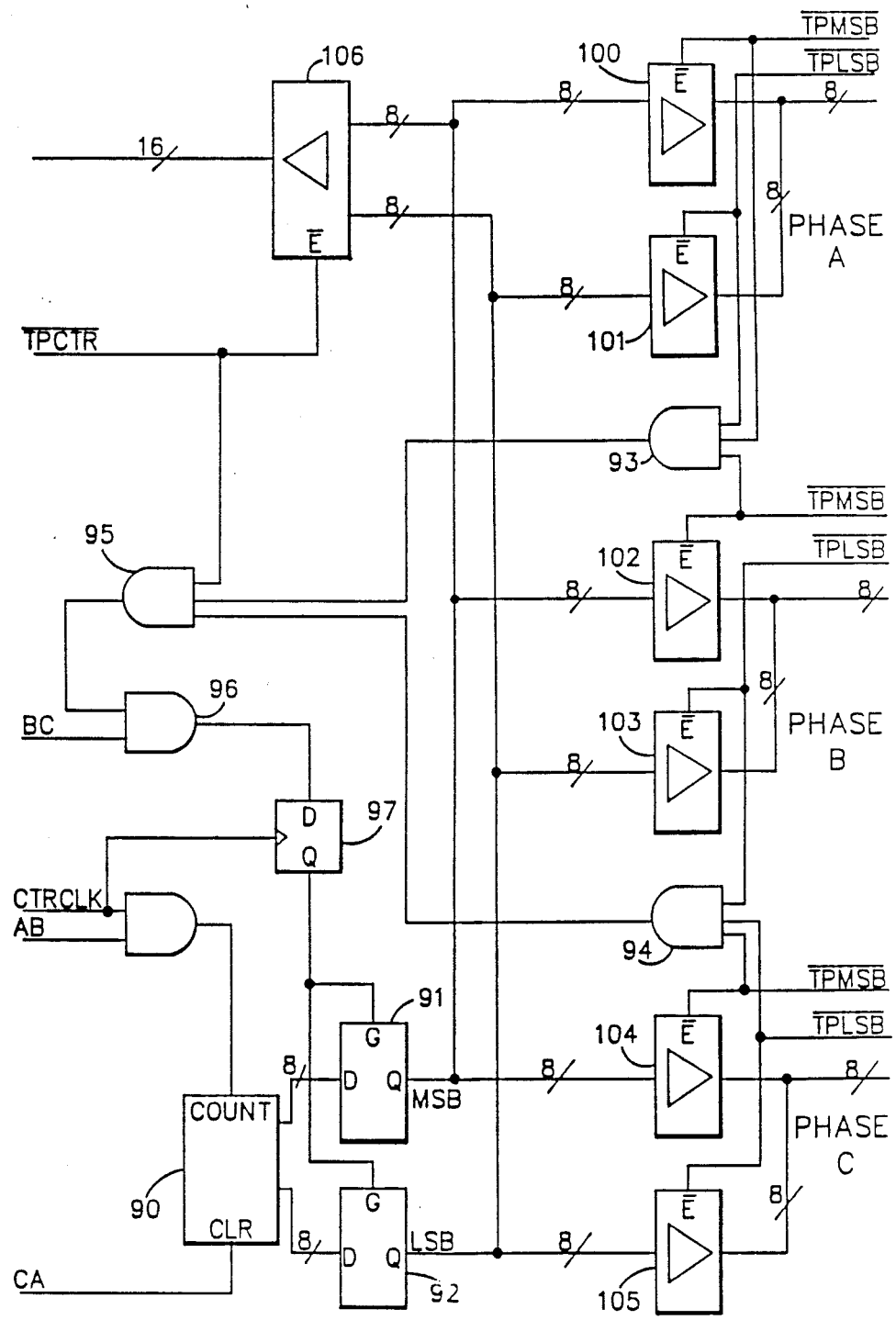
FIG. 11 is a schematic diagram of the timing pulse derivation and distribution portion of the main controller interface board.

The timing pulse derivation and distribution unit 46, illustrated in FIG. 11, is responsible for the monitoring of the supply frequency. That frequency is monitored by measuring the duration of every AB Timing Period. Three timing pulses are used: AB, CA and BC. A 16-bit Timing Period Counter 90 counts the number of cycles of the CTRCLK input signal (which will be more fully described subsequently) only when the AB pulse is high, thus giving an accurate count of the width of the AB pulse. The BC pulse latches the AB pulse width count to a set of latches 91 and 92. Whenever the current Timing Period pulse width is required, these latches are read. The BC pulse is logically connected to the request lines from the three phase controllers and the main controller by means of gates 93, 94, 95 and 96, and D flip-flop 97, so that no data is transferred to the latches while one of those controllers is reading the content of latches 91 and 92. Since each of the phase controllers utilizes the Motorola 6800 ™ 8-bit microprocessor, each controller has two timing pulse request signals, TPLSB and TPMSB. Each pair of TPLSB and TPMSB signals enable an associated pair of the tri-state buffers, 100 to 105, and each phase controller then determines the Timing Period pulse width by two transfers on the 8-bit data bus. As well as controlling data transfer to the latches 91 and 92, the TPCTR control signal is used by the main controller to read the content of those latches from the 16-bit tri-state buffer 106. The CA pulse is utilized to clear Timing Period Counter 90 after its count has been transferred to latches 91 and 92; counter 90 is then capable of measuring the next AB pulse width.

Figure 12:
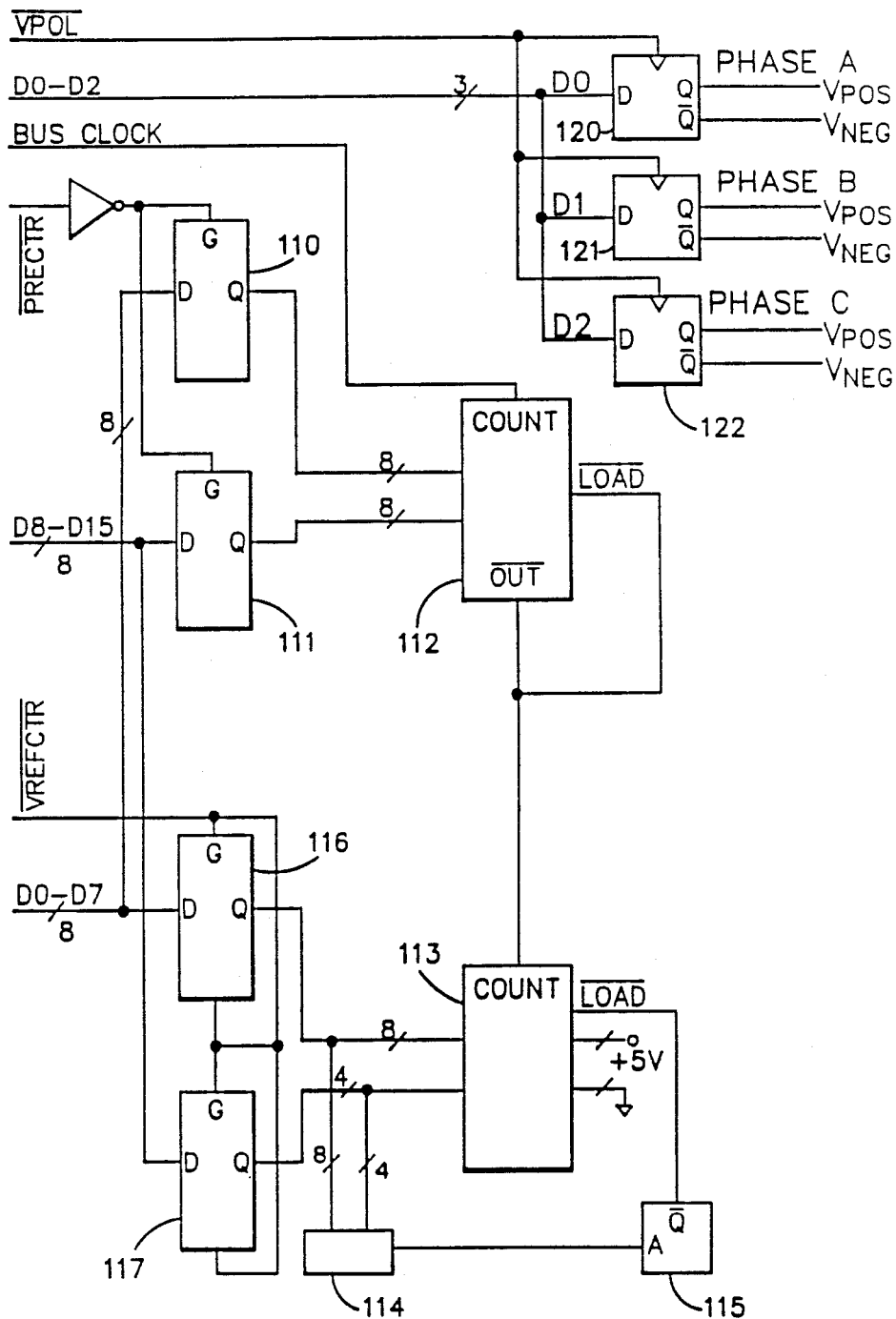
FIG. 12 is a schematic diagram of the reference voltage implementation portion of the main controller interface board.

FIG. 12 illustrates the circuitry of the reference voltage implementation unit 47. This unit is responsible for creating the digital representation of the analog reference waveform. For purposes of improved accuracy, the previously-discussed angle $\alpha$ was multiplied by four, i.e. $\beta = \alpha/4$. Equation 11 then becomes:

$$t_f = t_m \cdot \frac{(\beta - 360)}{(\beta_1 - 360)} \qquad \text{Equation 13}$$

and Equation 12 becomes:

$$t_f = t_m \cdot \frac{(1800 - \beta)}{(1800 - \beta_1)} \qquad \text{Equation 14}$$

Similarily, recognizing that $w_o/w_i = \text{FOUT}/\text{FIN}$ and $\text{FIN} = \text{CLK}/(6 \cdot \text{TP})$, where FIN = supply voltage frequency, FOUT = desired output voltage frequency, CLK = system clock frequency (10 MHz.), and TP = length of Timing Period in clock cycles, Equation 10 becomes:

$$\beta_1 = 1080 - (\text{FOUT}) \cdot (\text{TP}) \cdot (4320)/(\text{CLK}) \qquad \text{Equation 15}$$

The reference voltage implementation unit functions in the following way. A 16-bit value for PRECNT is first calculated using the formula:

$$\text{PRECNT} = \text{CLK}/((360) \cdot (4) \cdot (\text{FOUT})) \qquad \text{Equation 16}$$

where
CLK = 10 MHz. system clock,
360 = degrees per period,
4 = $\beta/\alpha$ conversion, and
FOUT = desired output frequency.

The value of PRECNT is calculated by the main controller unit 34 after the desired value of FOUT has been fed to that unit. That PRECNT value is loaded into the pair of 8-bit latches 110 and 111 by the control signal PRECTR. A recurring cycle occurs in which the 16-bit value in latches 110 and 111 is loaded into a counter 112, that counter is decremented to zero by the 10 MHz. system clock signal, and counter 112 outputs a signal which clocks a second counter 113 and also reloads counter 112 with the 16-bit value. Counter 113 is incremented by the signal from counter 112, and that count is monitored by logic circuit 114. When logic circuit 114 senses a count of 1800, i.e. the maximum value of $\beta$, that circuit triggers a one-shot multivibrator 115; multivibrator 115 in turn activates a loading of counter 113 with the value 360 defined by hard-wired high and low inputs. This arrangement allows counter 113 to continuously cycle between a low value of 360 and a high value of 1800 at a frequency defined by the value of PRECNT. The 68000 microprocessor uses the VREFCTR control signal to load latches 116 and 117 with instantaneous values of the constantly-changing $\beta$ values from counter 113, and to load those latched values onto the data bus.

VPOS and VNEG signals for output voltage waveforms A, B and C, as also shown on FIG. 12, are created by latching values on the data lines D0, D1 and D2 into the three D flip-flops 120, 121 and 122 by means of the control signal VPOL. The 68000 processor determines the reference voltage polarity for the three output voltage waveforms by monitoring the value of $\beta$ and utilizing the following look-up table:

| Range | $V_A$ | $V_B$ | $V_C$ | Byte |
|---|---|---|---|---|
| $\beta < 01\text{E0H}$ | 1 | 0 | 0 | 01 |
| $\beta < 02\text{D0H}$ | 1 | 1 | 0 | 03 |

-continued

| Range | $V_A$ | $V_B$ | $V_C$ | Byte |
|---|---|---|---|---|
| $\beta < 03C0H$ | 0 | 1 | 0 | 02 |
| $\beta < 04B0H$ | 0 | 1 | 1 | 06 |
| $\beta < 05A0H$ | 0 | 0 | 1 | 04 |
| $\beta < 0690H$ | 1 | 0 | 1 | 05 |
| $\beta > 0690H$ | 1 | 0 | 0 | 01 |
| Data Bit | D0 | D1 | D2 | |

In the above table, a '1' value for $V_A$, $V_B$ or $V_C$ indicates that the particular voltage waveform has a positive value at that point, whereas a '0' value indicates that the voltage waveform has a negative value at that point. The three voltage waveforms, which are 120 degrees out-of-phase with each other, are each positive for three of the six periods and negative for the other three. One complete cycle of each of the three voltage waveforms is included in the above table, with $\beta$ ranging between 360 (0168H) and 1800 (0708H). By the foregoing means, the 68000 microprocessor is able to assign a reference voltage polarity to $V_A$, $V_B$ and $V_C$.

Once the microprocessor has read the instantaneous value of $\beta$ from latches 116 and 117, it compares that $\beta$ value with the value of $\beta_1$ that was calculated using Equation 15. The value of $t_m$ is calculated using $t_m = 3.TP$, where $TP = $ Timing Period. The applicable one of Equations 13 and 14 is then used to calculate $t_f$. Table II is a listing of the algorithm that is used in that calculation; the source code and instruction execution times for the 68000 are shown. The algorithm first obtains current values of the Timing Period (D1) and $\beta$ (D0) from the main controller interface board. It then calculates the three phase reference voltage polarities from $\beta$. Once the reference voltage polarities have been set, the firing algorithm then calculates the two other variables required for the determination of the delay counts, $\beta_1$ (D2) from Equation 15 and $t_m$ (D3) from 3.TP. When these variables have been calculated, the delay routine CALDELAY is implemented. It compares $\beta$ (D0) with $\beta_1$ (D2), and utilizes one of Equations 13 and 14; which one is chosen depends on the outcome of the comparison.

Figure 13:
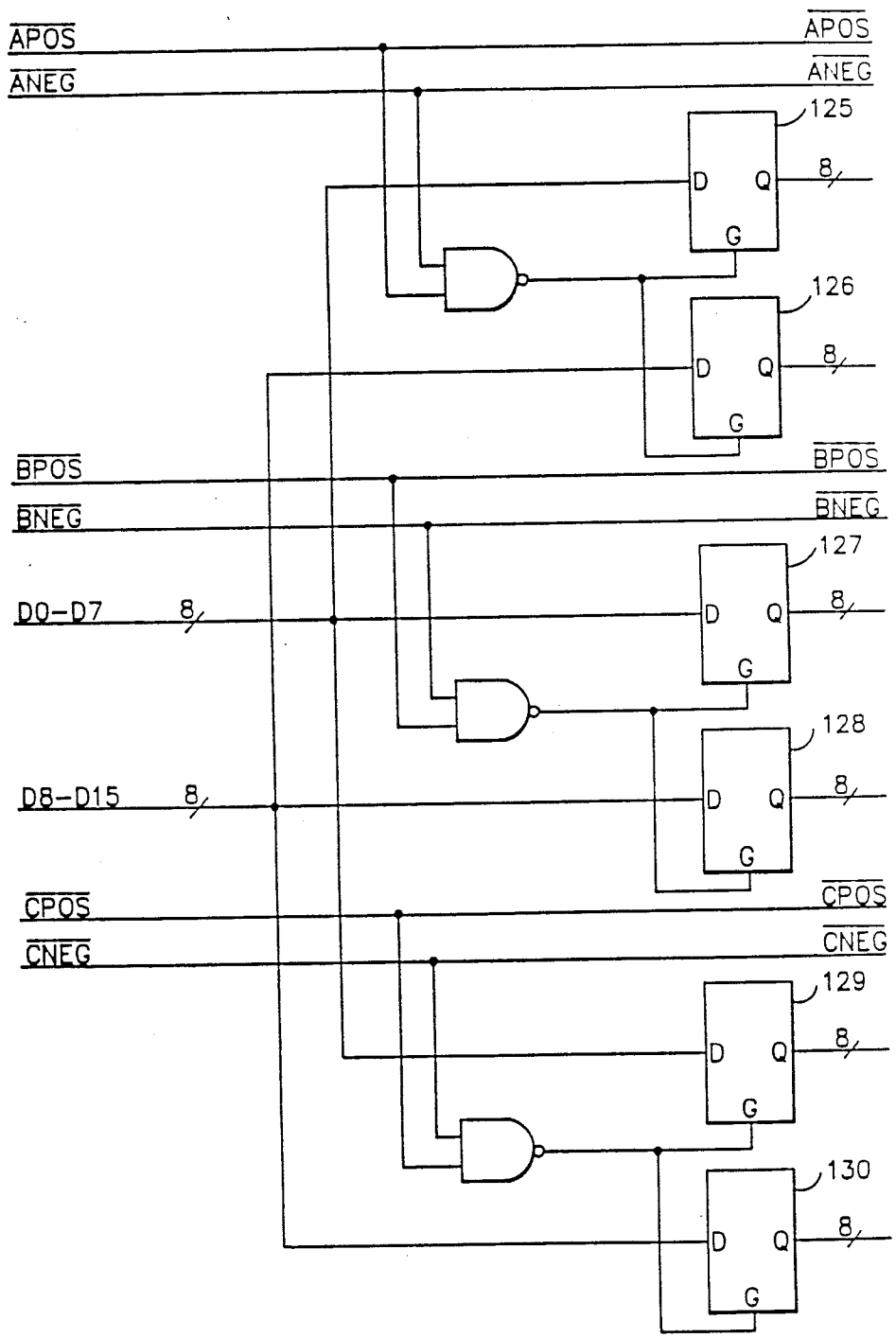
FIG. 13 is a schematic diagram of the delay count distribution portion of the main controller interface board.

With reference to FIG. 9, the algorithm is triggered by an interrupt caused by the CA input going low; the interrupt is reset by one of the final instructions of the algorithm. The first $\beta$ and $t_f$ values are therefore associated with the CB pulse (see FIG. 10). With reference to FIG. 13, the first $t_f$ value is stored in the pair of latches 125 and 126 associated with waveform A. The algorithm adds 480 (120 degrees) to the first $\beta$ value, and calculates a second $t_f$ value based on the new $\beta$ value. The second $t_f$ value, which is associated with the AC pulse, is transferred to latches 127 and 128, which are associated with waveform B. A third $t_f$ value is then calculated by adding 480 (120 degrees) to the second $\beta$ value. That $t_f$ value, which is associated with the BA pulse, is transferred to latches 129 and 130 which are associated with waveform C. Whenever the calculated $\beta$ value exceeds 1800, $\beta$ is reset to its in-range value by subtraction of 1440. The algorithm also calculates the reference voltage polarities, i.e. 1 or 0 for $V_A$, $V_B$ and $V_C$, for each $\beta$ value. The three control signals APOS, BPOS and CPOS are used to gate the $t_f$ values into the respective pairs of latches, as shown in FIG. 13. The reason for the latches stems from the fact that the 68000 system microprocessor is operating at a higher clock speed than the 6809 ™ microprocessors operating the phase controllers. Without the latches, the 68000 would have to wait for a response to its ready signal. Inclusion of the latches allows the 68000 to dump a $t_f$ delay count into a pair of the latches and to carry on with calculation of the next delay count.

The fourth $t_f$ value is calculated by adding 1200 (300 degrees) to the third $\beta$ value. That $t_f$ value, which is associated with the BC pulse, is transferred to latches 125 and 126. The fifth $t_f$ value is calculated by adding 480 (120 degrees) to the fourth $\beta$ value. That $t_f$ value, which is associated with the CA pulse, is transferred to latches 127 and 128. The sixth and final $t_f$ value is calculated by adding 480 (120 degrees) to the fifth $\beta$ value. That final $t_f$ value, which is associated with the AB pulse, is transferred to latches 129 and 130. The three control signals ANEG, BNEG, and CNEG, are used to gate the fourth, fifth and sixth $t_f$ values, respectively, into the respective pair of latches. After calculation of the six $t_f$ values the algorithm terminates with an interrupt reset instruction.

Figure 14:
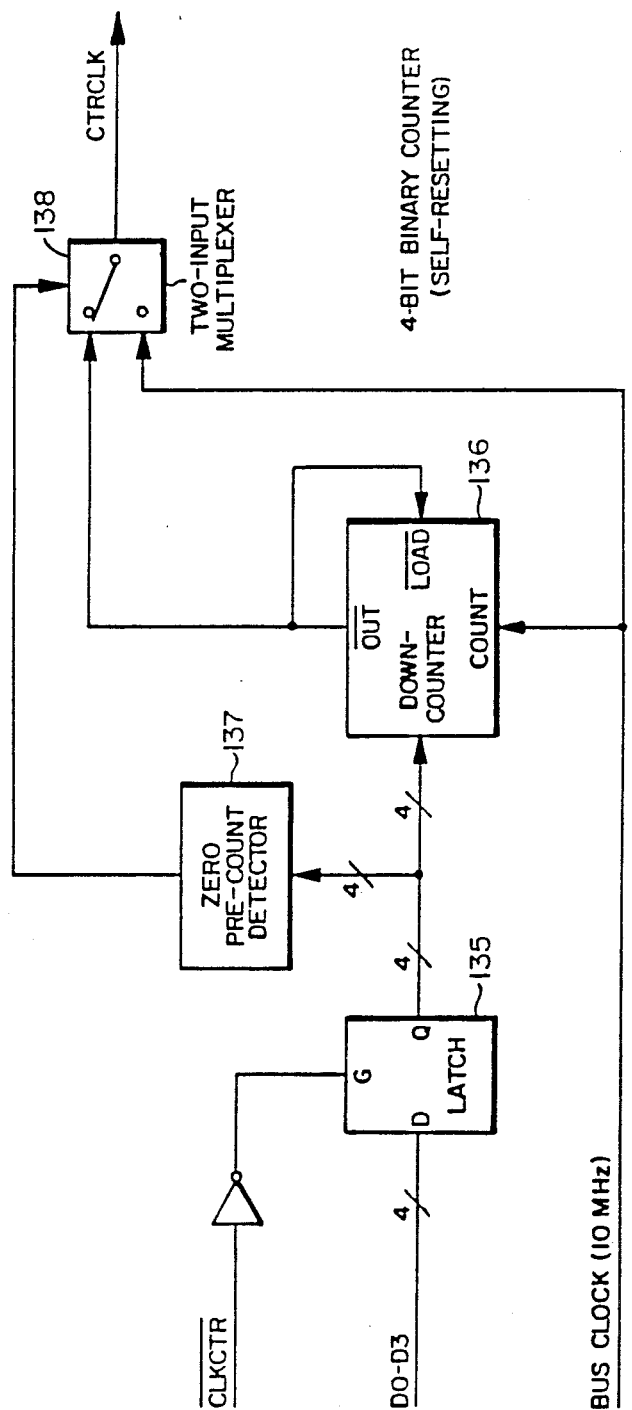
FIG. 14 is a schematic diagram of the counter frequency controller portion of the main controller interface board.

The algorithm in Table II takes 279.07 microseconds to execute. The algorithm must be executed six times during the period of each input voltage waveform (since that waveform is equivalent to six Timing Periods). Allowing a margin of approximately 15% for execution of the algorithm, each input waveform must be longer than approximately 1.8 milliseconds. Therefore, the upper frequency limit for the supply voltage is approximately 550 Hz. The lower frequency limit for the supply voltage for the arrangement thus far discussed is determined by the combination of the two counters 112 and 113 in FIG. 12. With a 10 MHz. system clock and a maximum count of 0FFFFH in counter 112, counter 113 is clocked once every 6.6 milliseconds which corresponds to a supply voltage frequency of 76.3 Hz. In order to operate with a lower supply voltage frequency, the 10 MHz. system clock frequency must be divided, and this is accomplished by the timing pulse derivation and distribution unit, which is designated as 49 in FIG. 6 and illustrated in FIG. 14. The CLKCTR control signal is used to gate a 4-bit latch 135 with four data bits D0-D3, those bits forming the input count to a counter 136. Counter 136 is decremented by the system clock, a zero output reloading the count contained in latch 135. A pre-count detector latch 137 is loaded prior to the loading of latch 135; if latch 137 is loaded with the value zero, then 2-input multiplexer 138 passes the system clock, otherwise it passes the output of counter 136. The output of multiplexer 138, which is labelled CTRCLK, is the input signal to timing pulse derivation and distribution unit 46 (illustrated in FIG. 11 and earlier discussed). CTRCLK is also a signal that is distributed to the three phase controllers, as can be seen from FIG. 6.

The three phase controllers of the cycloconverter system will next be described.

The main function of each phase controller is to accept the firing delays calculated by the main controller and to apply those delays to pass segments of the appropriate voltage differentials of the input voltage waveforms at the appropriate time. Each voltage differential could be assigned its own counter such that the distribution system would only have to load a particular counter with the calculated firing delay count prior to that counter being started by a synchronization pulse. This method would ensure sychronization and not require any sophisticated software synchronization techniques; however, the method is hardware intensive. An alternative approach, and the one adopted in this embodiment, is to utilize a down-counter to process the firing delay counts and to utilize a ring-counter to distribute the resultant counter output pulses. This approach reduces the hardware requirements of the system but at the expense of increased software control complexity.

The three phase controllers each consists of a 68B09 microprocessor operating at 2 MHz. and sharing a GIMI X ™ bus with 2K of RAM, 2K of EPROM, a 68B20 Peripheral Interface Adapter (PIA), a positive bank down-counter, and a negative bank down-counter. The output of the positive bank down-counter is connected to the advance signal of a positive bank ring-counter; the output of the negative bank down-counter is connected to the advance signal of a negative bank ring-counter. Outputs from the two ring-counters are fed to the inputs of associated pulse transformers, the outputs of those transformers being the triggering inputs of associated thyristors. Bank selection circuitry is also part of each phase controller, as will be more fully described.

Figure 15:
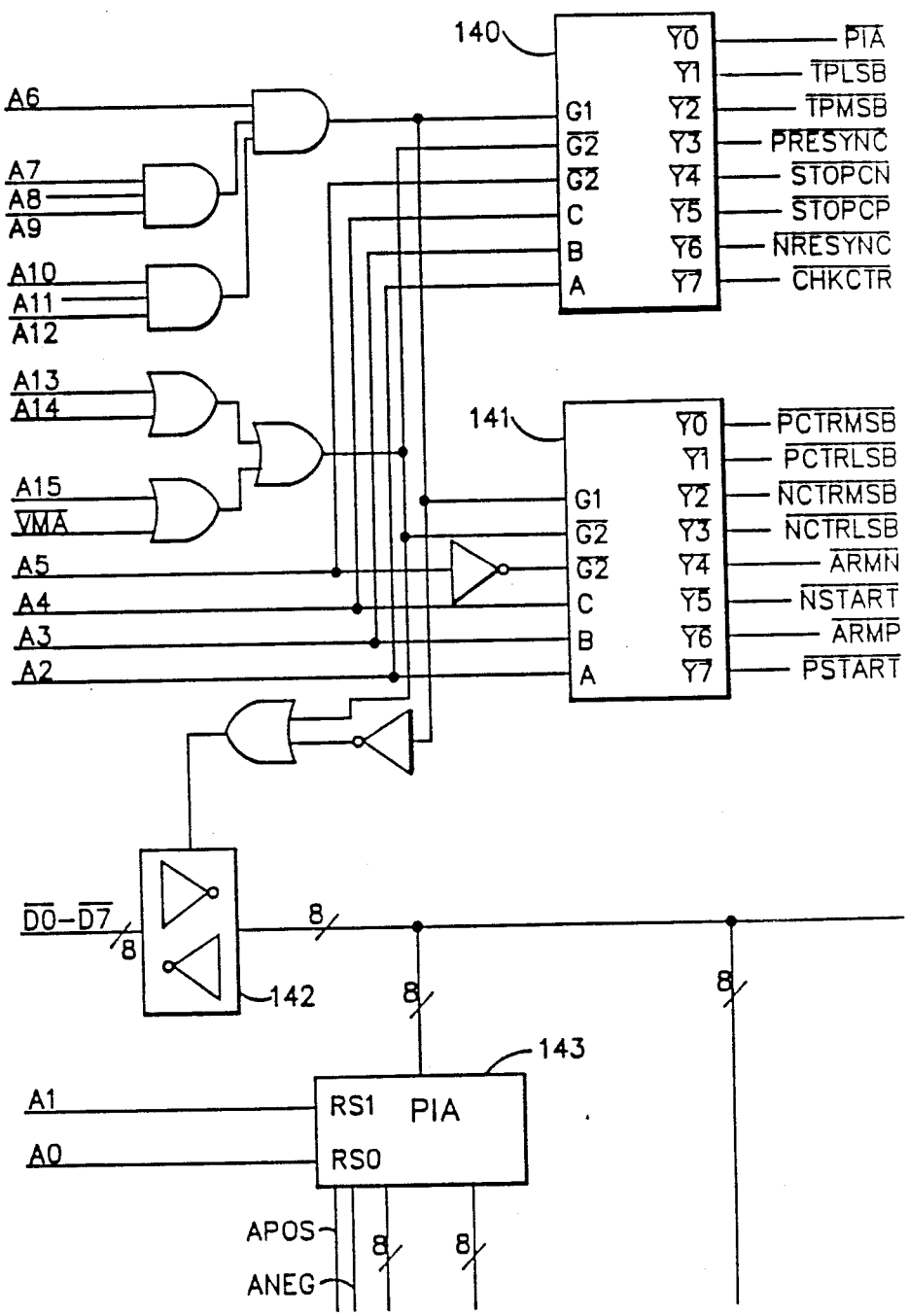
FIG. 15 is a schematic diagram of the address decoding utilized by the phase controllers of the cycloconverter system.

As with the main controller, each phase controller utilizes address decoding for control signals. In the following comments, any reference to particular components and control signals will be with reference to the Phase A Controller, although the other two phase controllers will operate in identical fashion. By 'Phase A' in this context is meant the output voltage waveform A. The address decoding scheme, as illustrated in FIG. 15, is similar to that utilized by the main controller. As well as 14 address lines, the VMA (Valid Memory Address) output of the 68809 is utilized. Elements 140 and 141 are 74LS138 3-to-8 decoders. The same address lines that activate decoders 140 and 141 also activate a bi-directional latch 142 on the phase controller's 8-bit data bus. As earlier discussed, the main controller's interface board does not utilize such a bus isolation means and that board is therefore continuously 'on-the-bus'. Table III contains a description of each of the control signals shown in FIG. 15. The addresses shown in Table III are all multiples of four, since A0 and A1 are used for register selection on the PIA 143. PIA 143 is initialized to accept the 16-bit delay count from latches 125 and 126 (see FIG. 13) by using the A-port for the least significant byte and the B-port for the most significant byte. PIA 143's control lines are tied to the 68000's APOS and ANEG control signals, those signals being used as inputs to indicate whether the 16-bit word received is for the positive bank or the negative bank. The PIA interrupts are normally disabled, and the 68B09 polls the PIA when it is ready for the delay angle value. The 68B09 expects, and must receive, the positive delay count before the negative delay count.

Figure 16:
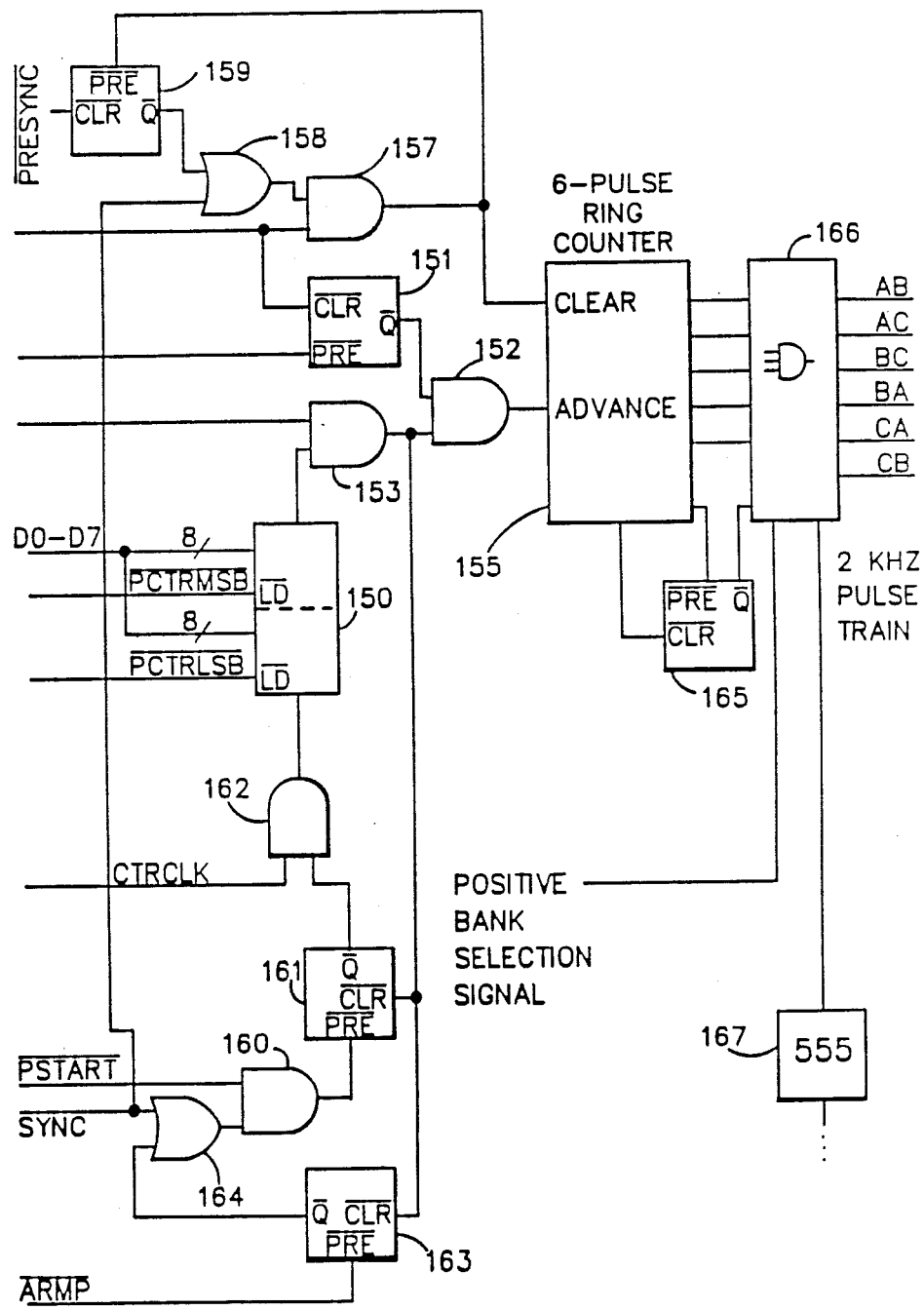
FIG. 16 is a schematic diagram of one of the two firing delay distribution units utilized by each of the phase controllers.

FIG. 16 illustrates the positive timing distribution unit for phase A. With reference to Table III, that unit uses the control signals PRESYNC, STOPCP, PCTRMSB, PCTRLSB, ARMP and PSTART. Phase A also utilizes an identical negative timing distribution unit, that unit using the control signals denoted with 'N' instead of 'P'. There exist similar positive and negative timing distribution units for each of phases B and C. The purpose of each distribution unit is to output a signal having a pulse width equivalent to the firing delay count that is loaded into the 16-bit down-counter 150 by the control signals PCTRMSB and PCTRLSB. The START signal (see FIG. 9) from the main controller sets flip-flop 151, and that in turn enables 2-input AND-gate 152. If the STOPCP control signal is inactive (low), the enabling of gate 153 allows the zero-count low output of down-counter 150 to be passed to gate 152. The advance input of six-pulse ring-counter 155 is triggered by a low-transition on the output of gate 152, and the length of time between two consecutive triggerings of the ADVANCE input of ring-counter 155 determines the length of the respective firing delay pulse. The STOP signal (see FIG. 9 and Table I) from the main controller clears flip-flop 151, and also acts through AND-gate 157 to clear ring-counter 155. Both the SYNC and PRESYNC signals are inputs to OR-gate 158, the output of OR-gate 158 being the second input to AND-gate 157. A low output on gate 157 acts to set the output of flip-flop 159 high. There are two methods of starting down-counter 150, PSTART and ARMP. In the first method, PSTART starts the counter immediately by being a second low input into AND-gate 160, a low output from that gate setting flip-flop 161. A high output from flip-flop 161 allows the counter frequency, CTRCLK (see FIG. 14), to pass through AND-gate 162 and clock down-counter 150. In the second method, a low ARMP signal sets flip-flop 163, the negative output of that gate is ORed with the SYNC pulse in OR-gate 164, and the output of OR-gate 164 then synchronizes the start of the count in down-counter 150 to the next SYNC pulse. When the count in down-counter 150 reaches zero, flip-flops 161 and 163 are cleared, the CTRCLK input is disabled, and down-counter 150 is stopped. At the same time, the ADVANCE input of ring-counter 155 goes low to terminate the one firing delay pulse and start the sequential pulse. The count in down-counter 150 can also be stopped by placing the STOPCP signal low, which clears the flip-flops 161 and 163.

Figure 18:
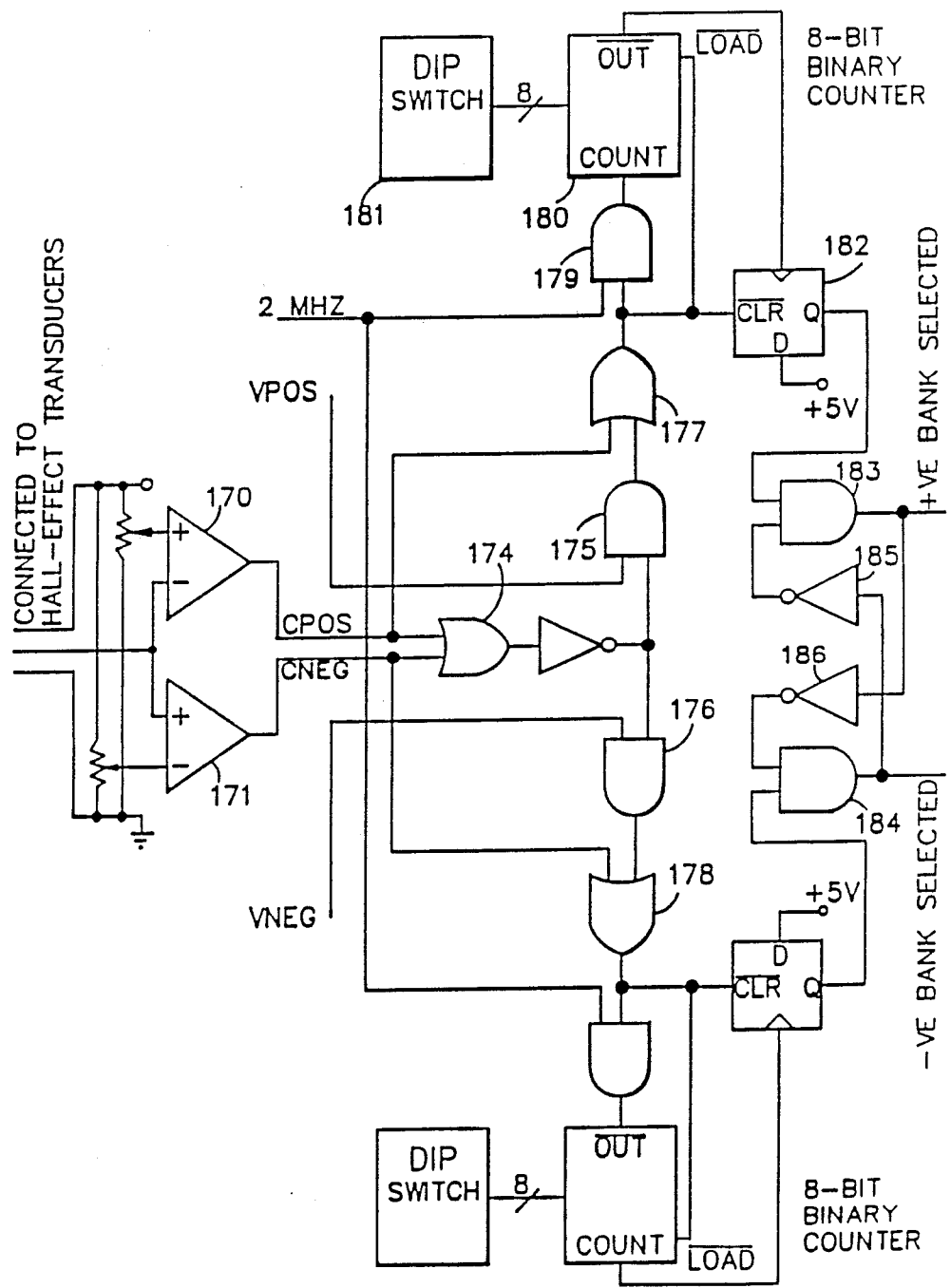
FIG. 18 is a schematic diagram of the circuitry utilized by each phase controller in selecting between the positive and negative thyristor banks associated with that controller.

Ring-counter 155 consists of six J-K flip-flops that are wired so that only one flip-flop is in an active high state at any one time. A pulse from down-counter 150 results in the active pulse being transferred to the next J-K flip-flop. After ring-counter 155 has been cleared, the next zero-count pulse from down-counter 150 activates the AB portion of ring-counter 155, the subsequent activation sequence being AC, BC, BA, CA, CB, AB, etc. Ring-counter 155 can be cleared by one of two signals, the STOP signal from the main controller or the PRESYNC signal from the phase controller. Although the PRESYNC signal clears ring-counter 155 and ensures that the next ADVANCE pulse is the AB pulse, the previous CB pulse may not have had time prior to being cleared by the PRESYNC signal to trigger its associated thyristors. For that reason, the CB pulse is controlled by flip-flop 165, being activated by the CA pulse going low and cleared by the AB pulse going high. The six output pulses from ring-counter 155 each enter into a respective three-input AND-gate in a bank 166 of six such AND-gates. The other two inputs of each three-input AND-gate are the positive bank selection signal (the creation of which is illustrated in FIG. 18 and described subsequenty) and a 2 KHz. pulse train. That pulse train, which is comprised of 50 percent duty-cycle square-waves produced by a 555 timer chip 167, is used to generate 'machine-gun' pulses for reliable thyristor firing.

Figure 17:
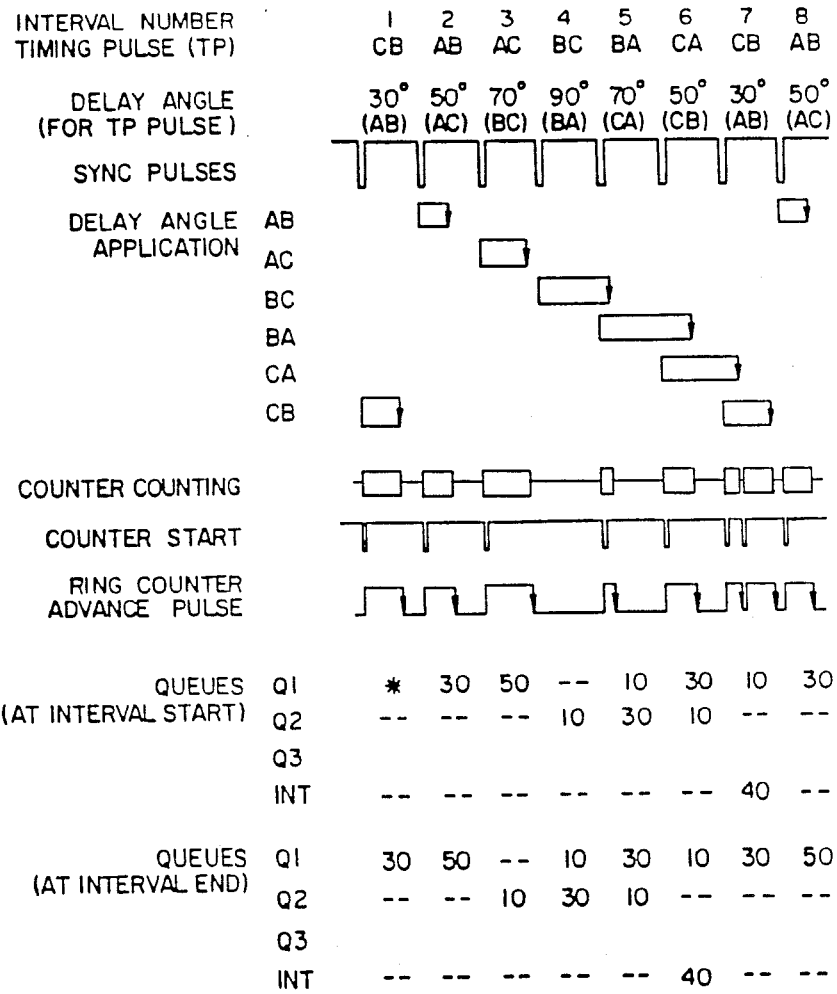
FIG. 17 is an illustration of the queueing of the delay counts executed in software by each of the phase controllers.

A problem for the single down-counter/ring-counter arrangement occurs when the firing delay angle, $t_{fa}$, exceeds 60 degrees. That results from the inability of the single down-counter to handle a new $t_{fa}$ until it has finished with the count from the previous $t_{fa}$. A queueing algorithm is necessary to queue successive $t_{fa}$'s so that the down-counter processes each one sequentially. These queued $t_{fa}$'s must be modified, however, since their application to the down-counter will be delayed by one or two timing periods. Therefore, a three-element queue is required. If the elements are identified as Q1, Q2 and Q3, then Q1 is utilized for $t_{fa}$ less than 60 degrees, Q2 is utilized for $t_{fa}$ more than 60 degrees but less than 120 degrees, and Q3 is utilized for $t_{fa}$ more than 120 degrees. As an example, a $t_{fa}$ of 90 degrees would be decremented by 60 degrees, and loaded into Q2, to be advanced into Q1 during the next pulse and loaded into the down-counter during the subsequent pulse. In addition, special queueing modes must exist for transition periods when the $t_{fa}$ increases or decreases through the 60-degree and 120-degree ranges. FIG. 17 depicts the transition of $t_{fa}$ through these ranges. The low-going pulses to the ring-counter ADVANCE input correspond exactly to the firing pulses that would result from the utilization of separate counters, as indicated in the Delay Angle Application portion of FIG. 17.

For the intervals 1 to 4 in FIG. 17, $t_{fa}$ increases from 30 degrees to 90 degrees. It can be seen that for interval 1 the CB segment of the supply waveform is dominant. During the CB segment, a 30-degree $t_{fa}$ is calculated for application during the next segment, the AB segment. That 30-degree $t_{fa}$ is loaded into the top of the queue Q1 relating to the AB segment. In interval 2 that $t_{fa}$ is loaded from Q1 into down-counter 150, and the counter is started. The queue is then traversed, the contents of Q2 being moved into Q1, the contents of Q3 being moved into Q2, and Q3 being cleared. When the count in down-counter 150 reaches zero, ring-counter 155 is advanced by a low-going pulse which activates a different output of the ring-counter to fire the thyristors associated with the AB segment. While that is happening, the $t_{fa}$ of 50 degrees for the AC segment is being calculated and placed on top of the queue. In interval 3, that 50-degree $t_{fa}$ is loaded into down-counter 150, and the counter started. During that count, a 70-degree $t_{fa}$ for the BC pulse is being calculated and placed on top of the queue. Since 70 degrees is greater than a timing pulse of 60 degrees, 60 degrees is subtracted from the $t_{fa}$ and the resultant 10 degrees placed into Q2. At the start of interval 4, there is no counter start pulse. However, when the queue is advanced, i.e. for interval 5, the 10 degrees is moved from Q2 to Q1 for placement into down-counter 150 during the next timing pulse. Since the next $t_{fa}$ is 90 degrees, 30 degrees is placed into Q2. This is the mechanism by which the queueing algorithm skips either one or two pulses if $t_{fa}$ exceeds either 60 or 120 degrees, respectively.

Intervals 4 to 8 in FIG. 17 illustrate the means by which the algorithm effects two firing pulses during one timing pulse. This condition occurs when the $t_{fa}$ decreases through the either the 120-degree or 60-degree boundaries. As mentioned, the 10-degree remainder $t_{fa}$ is fetched from Q1 and loaded into down-counter 150 at the start of interval 5. The 30-degree remainder in Q2 is advanced to Q1. Since the next $t_{fa}$ is 70 degrees, 10 degrees is placed into Q2. At the start of interval 6, the 30-degree remainder in Q1 is placed into down-counter 150, and the 10-degree remainder is advanced from Q2 to Q1. The next $t_{fa}$ of 50 degrees is calculated, but it cannot be placed into Q1 since the 10-degree remainder is occupying that position. The algorithm therefore enters an 'interval mode' in which it calculates the interval between the $t_{fa}$ presently in Q1 and the 50-degree $t_{fa}$ which would like to be in Q1. The interval is the difference between the two $t_{fa}$'s, i.e. 40 degrees, and it is stored in an interval queue, INT. At the start of interval 7, the algorithm detects a non-zero value in the interval queue, INT, and sets a flag accordingly. It then processes the queue routinely, including placing the next $t_{fa}$ of 30 degrees into Q1. However, when that processing is concluded the algorithm checks the interval flags. Sensing that that flag is set, the algorithm waits for down-counter 150 to finish counting and then loads the interval value, i.e. 40 degrees, into the counter and restarts the counter. In this way, two $t_{fa}$'s are processed during one timing pulse, as illustrated in FIG. 17. The algorithm then reverts to its normal operating mode, i.e. loading down-counter 150 with the contents of Q1 during interval 8, and loading Q1 with 50 degrees.

The program for accomplishing the foregoing algorithm is in the phase controller's 2K EPROM and is summarized in Table IV. No monitor program is utilized; once powered, each phase controller initializes itself and then immediately enters a waiting loop routine. The delay count handling routine interrupts the loop routine by utilizing the Fast Interrupt (FIRQ) capability of the 68B09; that interrupt input of the 68B09 is tied to the SYNC signal. Table V describes the variables associated with the algorithm. Notice that each of the positive and negative down-counter/ring-counter units requires its own memory space for the queue, and XQ1, XQ2, XQ3, XINT1 and XINT2 in Table V are intended to represent both. 'X' stands for 'P or N'.

The program in Table IV has a main routine and a subroutine, the subroutine being labelled INTRVAL and being entered from step 12 of the main routine. The purpose of the INTRVAL subroutine is the processing of two firing delay counts in a single timing period. The subroutine is only required when the firing delay angle decreases through either 120 degrees or 60 degrees. In the case of a firing delay angle decreasing through 120 degrees, two storage addresses are required, XINT1 and XINT2, whereas in the case of a firing delay angle only decreasing through 60 degrees the XINT1 storage address is the only one needed. Whether XINT1 only or both XINT1 and XINT2 are required depends upon the value of that has been transmitted to PIA 143 (FIG. 15) by the 68000 microprocessor. At the start of the main routine, XINT1 is checked to determine if it has a non-zero value. If a non-zero value does exist, the XFLAG location is set, indicating that when the algorithm has completed the processing of the present delay angle count the routine must wait until the counter stops counting, must then load the XINT1 value into the counter, and must then restart the counter. If the XINT2 value is non-zero at the start of the timing period, that XINT2 value is transferred into XINT1 for processing during the next timing period.

The single down-counter/ring-counter arrangement has the drawback that noise may cause a loss of synchronization. It is therefore necessary to incorporate a scheme to ensure that this arrangement recovers from loss of synchronization. The rudimentary algorithm developed for that purpose involves the CB timing pulse. The algorithm, which is summarized in Table VI, ensures that the current firing delay is applied to the AB pulse. It is only entered if bit 7 of the CHKCTR tri-state buffer has a value of 1, indicating that the present timing period is the CB period. Just before the MAIN Routine (Table IV) ends, that routine checks to see if the current period is the CB period. If it is not, an exit is made from the MAIN Routine. If it is the CB period, the SYNC Subroutine is called to retrieve the present firing delay and process it according to the regular queueing algorithm except for the Interval Mode. The SYNC Subroutine also clears all unused variables, thus removing any residual effects of a previous glitch. If the firing delay angle is less than 60 degrees, the ring-counter 155 is reset via PRESYNC, so that the current firing delay angle activates the AB pulse. If the firing delay angle is greater than 60 degrees but less than 120 degrees, the XRFLAG is incremented to indicate that ring-counter 155 is to be reset during the next timing period. If the firing delay angle is greater than 120 degrees, the XRFLAG is incremented twice to indicate that ring-counter 155 is to be reset after the next timing period. The only time that ring-counter 155 is not reset is when the present AB firing delay angle requires processing by the Interval Mode of the queueing routine. The hardware construction of ring-counter 155 does not permit it to be reset during the middle of a timing period. Therefore, whenever a mid-pulse-reset is required, i.e. the current firing delay require processing by the Interval Mode, this synchronization routine bypasses the ring-counter reset procedure.

Each of the three phase controllers produces six output timing pulses for creating the positive portion of the output signal, and six output timing pulses for creating the negative portion of the output signal, i.e. a positive bank and a negative bank of pulses. The simplest method of control of these banks is to operate the cycloconverter system in a 'circulating current mode.' In this mode both banks are operating independently, each supplying the same average output voltage at their terminals. However, there exists instantaneous voltage differences between these output voltages. These differences tend to generate a 'circulating' current between the two banks. Limitation of such circulating current, which imposes a substantial 'reactive load' in addition to a 'dissipative load', is accomplished by means of current rector. The 'circulating current mode' is therefore use in practice only under special circumstances, and more particularly, at relatively light levels of output load for which relatively large circulating current can be tolerated.

The preferred method of control is the 'non-circulating' or 'circulating current-free' mode of operation. In this mode, each bank processes the delay counts as received, operating the down-counters and ring-counters normally. Unlike the 'circulating current mode', however, in this mode only one bank is allowed to conduct at one time, the other bank being blocked. Which bank conducts is determined by the load current polarity, not the reference voltage polarity. Only in the case of discontinuous current is the conducting bank selected by the reference voltage polarity. Due to the 'turn-off' characteristics of thyristors, care must be taken when changing banks to ensure that the thyristors in the off-going bank are off for a sufficient amount of time before thyristors in the on-coming bank are first fired. If both banks of thyristors are simultaneously on, a line-to-line short is possible. To prevent such a possibility, a delay mechanism must be inserted.

The first and oldest method of sensing current is the measurement of the voltage across a low-value resistance inserted in series with the load. However, at high power ratings this method is very inefficient; for instance, at a load current of 500 amperes and a resistance of 0.01 ohms, 2.5 kilowatts of waste heat is produced by each current sensor. The method utilized in this embodiment for measuring current involves linear Hall-Effect transducers (HET's). High currents may be measured by simple placement of an HET near the load current cable. For low currents, placement of the HET within a toroid and wrapping of the load current cable around that toroid several times is sufficient for accurate load current measurement. The circuit illustrated in FIG. 18 allows selection of either the positive or negative bank of pulses to be made upon both current and voltage considerations. If either of the two HET's on the output line senses current (one HET senses positive current and the other HET senses negative current), the sensed current determines which bank of pulses is selected. For discontinuous load current, however, reference voltage polarity, VPOS or VNEG (see FIG. 12), determines the pulse bank selection.

With reference to FIG. 18, the existence of positive or negative output current is first sensed by comparator 170 or comparator 171, respectively. One of the inputs of the comparators 170 and 171 is connected to a common ground, and the other input of each is connected to a resistance through which the respective HET feeds its signal current. The output of comparators 170 and 171 is fed to OR-gate 174, and the output of that gate is inverted and fed to a pair of AND-gates 175 and 176. If the current is zero, the output of OR-gate 174 is negative, and one of the VPOS and VNEG signal inputs determines the bank selection. On the other hand, if the current is not zero, the VPOS and VNEG signal inputs are ignored, and in that case the active current signal selects the bank by means of one of the OR-gates 177 and 178. An output from either OR-gate 177 or OR-gate 178 enables a bank-switchable-delay down-counter which then counts down from a DIP-switch-selectable preset value. With reference to the positive bank circuit in FIG. 18, a positive output from OR-gate 177 is combined with the 2 MHz. clock signal by AND-gate 179 for triggering the clock input of down-counter 180. The count commences with the value in DIP switch 181. When the count in down-counter 180 reaches zero, a high output is passed by flip-flop 182 to AND-gate 183. AND-gate 183 is part of a flip-flop arrangement which is also comprised of AND-gate 184 and inverters 185 and 186, that arrangement preventing both the positive and negative banks from being simultaneously selected. This circuitry provides a delay of selectable length between the sensing of the current or voltage input signal and the enabling of the selected bank. When the positive bank is de-selected, flip-flop 182 is cleared immediately and the positive bank is disabled at once. Simultaneously, counter 180 is reloaded with the count in DIP switch 181 to await the next bank selection interval.

The positive selection signals that are the output of the circuitry of FIG. 18 control the passage of the six positive firing pulses through the bank 166 of three-input AND-gates in FIG. 16. As previously mentioned, a copy of the circuitry illustrated in FIG. 16 is also used to create the six negative firing pulses. Each of the three phase controllers thus controls both a positive and a negative circuit like that in FIG. 16, twelve pulse signals being produced by each phase controller. Six phase distributors having the circuitry illustrated in FIG. 19 distribute the signals to the appropriate banks of thyristors, two such phase distributors being utilized for each of the three phases. With respect to the input and output signals on the circuitry of FIG. 19, the unbracketed quantities represent signals on the positive phase distributor, while the bracketed quantities represent signals on the negative phase distributor. The translation between the input firing pulse and the selection of the correct thyristors is accomplished by means of serially-connected input windings on the pulse transformers. The following relationship applies between the input pulses and the output signals on FIG. 19:

| Pulse | Thyristor Pair ||
|---|---|---|
|  | Positive | Negative |
| AB | 2,7 | 4,5 |
| AC | 2,11 | 4,9 |
| BC | 6,11 | 8,9 |
| BA | 6,3 | 8,1 |
| CA | 10,3 | 12,1 |
| CB | 10,7 | 12,5 |

Hammond 631D-Series pulse transformers are constructed such that a single winding on one side interfaces with two smaller windings on the other, the two sides having a unity turns-ratio. In normal applications, the single winding is the primary and the two smaller windings are secondaries. In this application, however, the smaller windings of each transformer 190 are made primaries and the single winding is made a secondary. By this means, explicit control is maintained over thyristor triggering. Such arrangement greatly simplifies the logic required to decode the firing pulses into their particular thyristor gating pulses. Other advantages of this arrangement are its immunity to noise and reliability. Pairs of the smaller windings are serially-connected in the manner shown in the preceding table, each winding pair forming the collector connection to one of a series of 2N1613 transistors 191. A firing pulse was fed to the gate of the transistor. Each phase distributor used six such transistors.

Figure 2:
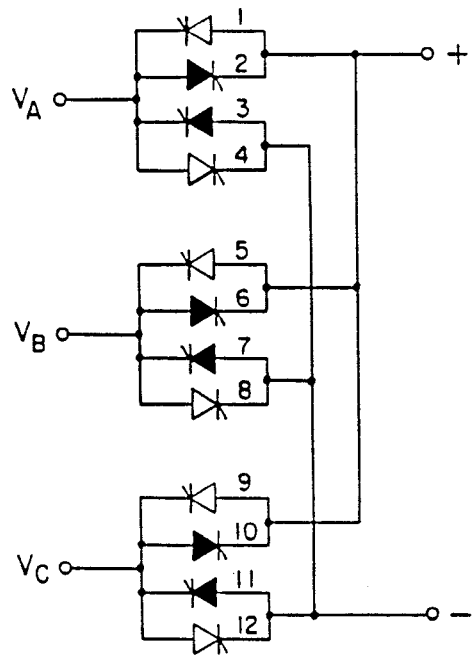
FIG. 2 illustrates a 6-pulse bridge-connected cycloconverter positioned between a three-phase supply voltage and a single-phase output voltage.
Figure 19:
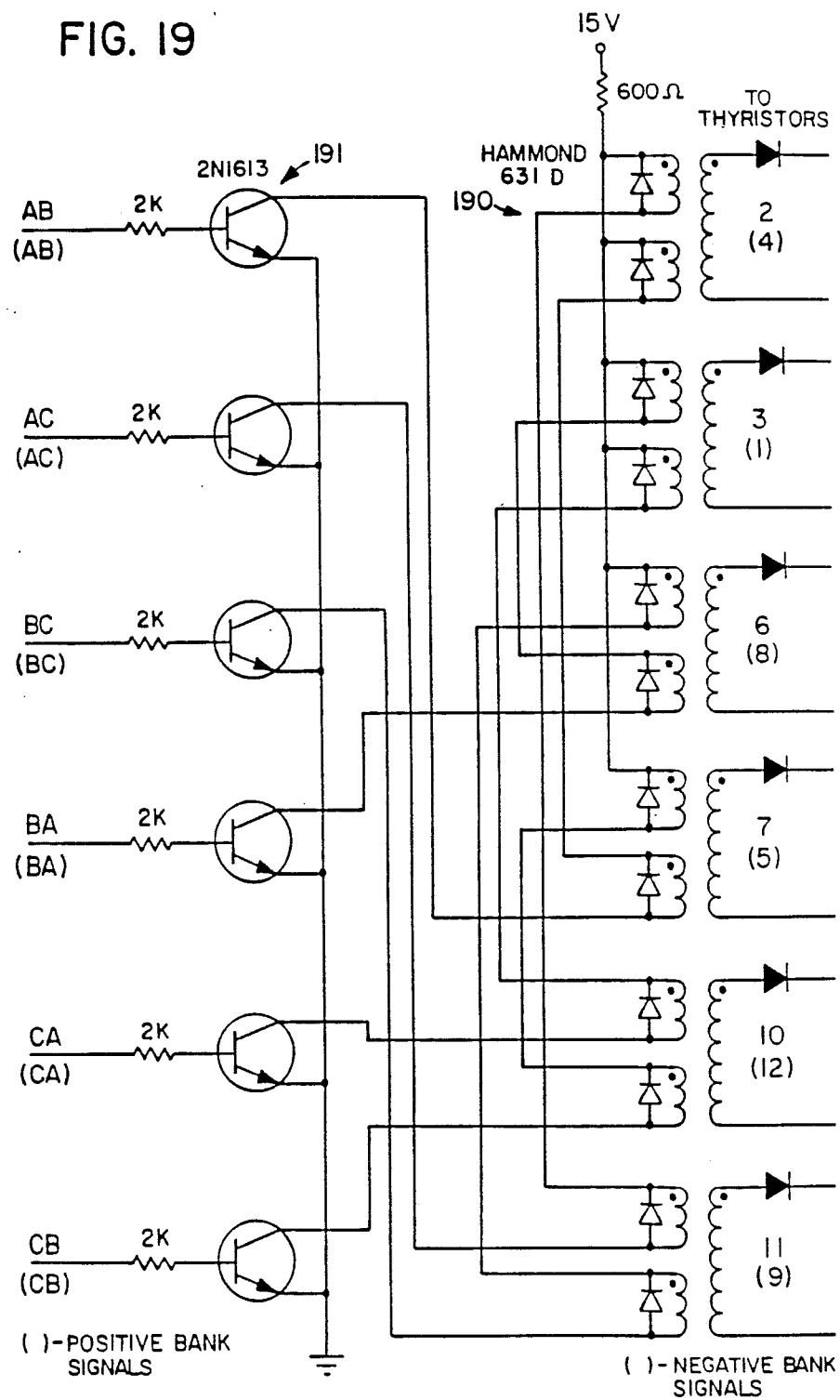
FIG. 19 is a schematic diagram of the pulse transformer circuitry utilized by each phase controller for linking each of the firing delays to an associated pair of thyristors.

The output signals from the circuitry of FIG. 19 are fed to the thyristor bank earlier discussed with respect to FIG. 2. Each of the three phase controllers is connected to a positive and a negative phase distributor, and those two phase distributors are in turn connected to the thyristor bank of FIG. 2. That thyristor bank has twelve thyristors, six of them being connected to the positive phase distributor and six of them being connected to the negative phase distributor. As an example of their operation, consider an AB input pulse to the respective one of the transistors 191 in FIG. 19. Thyristors 2 and 7 are fired, and FIG. 2 illustrates that a segment of the voltage differential $V_{AB}$ between the input voltage waveforms $V_A$ and $V_B$ becomes the output voltage waveform for the time interval. The voltage differential segment commences at a time delayed from the start of the time interval by the amount of the firing delay, and will terminate at a time delayed from the start of the following time interval by the amount of the following firing delay.

A menu-driven program was written for the Omnibyte TM microcomputer, the program initially prompting the computer user to select from a first menu the desired mode of operation (at present, the other modes listed on the menu are still being developed). Once the mode of operation discussed herein has been selected, the program prompts the user by a second menu to selectively start or stop the cycloconverter and to input a desired output frequency and a minimum supply frequency. If the minimum supply frequency is below 76.3 Hz., the 10 MHz. clock frequency is divided in the manner described previously. The second menu remains on the screen while the program is executing, allowing instantaneous changes to be made to the operation of the cycloconverter. A generalized outline of a program to accomplish these procedures is contained in Table VII.

TABLE I

| Signal | Address (HEX) | Purpose |
|---|---|---|
| IRQACK | 020000 | Acknowledges Level 7 Interrupt Request |
| STOP | 020002 | Disables Interrupt, Clears Ring-counters |
| BEGIN | 020004 | Enables system start on next SYNC pulse |
| VREFCTR | 020006 | Address to read hardware table |
| TPCTR | 020008 | Address to read Timing Pulse counter |
| PRECTR | 02000A | Address to set hardware table frequency |
| CLKCTR | 02000C | Address to set counter frequency |
| VPOL | 02000E | Address to set Reference Voltage polarities |
| APOS | 020014 | Signal to identify the delay count for the positive A-phase bank |
| ANEG | 020016 | Signal to identify the delay count for the negative A-phase bank |
| BPOS | 020018 | Signal to identify the delay count for the positive B-phase bank |
| BNEG | 02001A | Signal to identify the delay count for the negative B-phase bank |
| CPOS | 02001C | Signal to identify the delay count for the positive C-phase bank |
| CNEG | 02001E | Signal to identify the delay count for the negative C-phase bank |

TABLE II

| Label | NMEMONIC | Operand | Cycles | Time us. |
|---|---|---|---|---|
| CALDELAY | MACRO | | | |
|  | CMP.W | D0,D2 | 4 | 0.50 |
|  | BGT.S | *+20 | 10 | 1.25 |
|  | MOVE.W | 1800,D4 | 8 | 1.00 |
|  | SUB.W | D0,D4 | 4 | 0.50 |
|  | MULU | D3,D4 | 70 | 8.75 |
|  | MOVE.W | 1800,D5 | 8 | 1.00 |
|  | SUB.W | D2,D5 | 4 | 0.50 |
|  | DIVU | D5,D4 | 140 | 17.50 |
|  | BRA.S | *+18 | 10 | 1.25 |
|  | MOVE.W | D0,D4 | 4 | 0.50 |
|  | SUBI.W | 360,D4 | 8 | 1.00 |
|  | MULU | D3,D4 | 70 | 8.75 |
|  | MOVE.W | D2,D5 | 4 | 0.50 |
|  | SUBI.W | 360,D5 | 8 | 1.00 |
|  | DIVU | D5,D4 | 140 | 17.50 |
|  | ENDM | | | |
| Min (Max) Time = 31.1 us. (32.25 us.) | | | | |
| CHECK | MACRO | | | |
|  | CMP1.W | 1800,D0 | 8 | 1.00 |

TABLE II-continued

| Label | NMEMONIC | Operand | Cycles | Time us. |
|---|---|---|---|---|
| | BLT.S | *+6 | 10 | 1.25 |
| | SUBI.W | 1440,D0 | 8 | 1.00 |
| | ENDM | | | |

Min (Max) Time = 2.25 us. (3.25 us.)

| Label | NMEMONIC | Operand | Cycles | Time us. |
|---|---|---|---|---|
| VSCFIRQ | | | 47 | 5.89 |
| | MOVE.W | VREFCTR,D0($\beta$) | 12 | 1.50 |
| | MOVE.W | TPCTR,D1(TP) | 12 | 1.50 |
| | CMPI.W | 01E0H,D0 | 8 | 1.00 |
| | BLT.S | V1 | 8 | 1.00 |
| | CMPI.W | 02D0H,D0 | 8 | 1.00 |
| | BLT.S | V2 | 8 | 1.00 |
| | CMPI.W | 03C0H,D0 | 8 | 1.00 |
| | BLT.S | V3 | 8 | 1.00 |
| | CMPI.W | 04B0H,D0 | 8 | 1.00 |
| | BLT.S | V4 | 8 | 1.00 |
| | CMPI.W | 05A0H,D0 | 8 | 1.00 |
| | BLT.S | V5 | 8 | 1.00 |
| | CMPI.W | 0690H,D0 | 8 | 1.00 |
| | BLT.S | V6 | 8 | 1.00 |
| V1 | MOVE.W | 1,VPOL | 17 | 2.13 |
| | BRA.S | CONTIN | 10 | 1.25 |
| V2 | MOVE.W | 3,VPOL | 17 | 2.13 |
| | BRA.S | CONTIN | 10 | 1.25 |
| V3 | MOVE.W | 2,VPOL | 17 | 2.13 |
| | BRA.S | CONTIN | 10 | 1.25 |
| V4 | MOVE.W | 6,VPOL | 17 | 2.13 |
| | BRA.S | CONTIN | 10 | 1.25 |
| V5 | MOVE.W | 4,VPOL | 17 | 2.13 |
| | BRA.S | CONTIN | 10 | 1.25 |
| V6 | MOVE.W | 5,VPOL | 17 | 2.13 |
| CONTIN | MOVE.W | D1,D5 | 4 | 0.50 |
| | MOVE.W | D1,D3 | 4 | 0.50 |
| | ASL.W | 1,D3 | 8 | 1.00 |
| | ADD.W | D1,D3($t_m$) | 4 | 0.50 |
| | MULU | TOVRCT,D5 | 78 | 9.75 Note 1 |
| | DIVU | 2315,D5 | 144 | 18.00 |
| | AND.L | FFFFH,D5 | 8 | 1.00 |
| | MOVE.W | 1080,D2 | 8 | 1.00 |
| | SUB.W | D5,D2($\beta$1) | 4 | 0.50 |
| | CALDELAY | | 248 | 31.10 |
| | MOVE.W | D4,APOS | 14 | 1.75 |
| | ADDI.W | 480,D0 | 8 | 1.00 |
| | CHECK | | 26 | 3.25 |
| | CALDELAY | | 256 | 32.25 |
| | MOVE.W | D4,BPOS | 14 | 1.75 |
| | ADDI.W | 480,D0 | 8 | 1.00 |
| | CHECK | | 18 | 2.25 |
| | CALDELAY | | 248 | 31.10 |
| | MOVE.W | D4,CPOS | 14 | 1.75 |
| | ADDI.W | 1200,D0 | 8 | 1.00 |
| | CHECK | | 18 | 2.25 |
| | CALDELAY | | 256 | 32.25 |
| | MOVE.W | D4,ANEG | 14 | 1.75 |
| | ADDI.W | 480,D0 | 8 | 1.00 |
| | CHECK | | 18 | 2.25 |
| | CALDELAY | | 248 | 31.10 |
| | MOVE.W | D4,BNEG | 14 | 1.75 |
| | ADDI.W | 480,D0 | 8 | 1.00 |
| | CHECK | | 18 | 2.25 |
| | CALDELAY | | 256 | 32.25 |
| | MOVE.W | D4,CNEG | 14 | 1.75 |
| | MOVE.W | IRQACK,D0 | 14 | 1.75 |
| | RTE | | 20 | 2.50 |

Total Required Time = 279.07 us.
= 86.7% of available time

Note 1: $TOVRCT = \frac{(10000000) \cdot (FOUT)}{(CLK)}$

TABLE III

| Signal | Address (HEX) | Purpose |
|---|---|---|
| PIA | 1FC0 | Base address for PIA registers |
| TPLSB | 1FC4 | Timing Pulse Least Significant Byte |
| TPMSB | 1FC8 | Timing Pulse Most Significant Byte |
| PRESYNC | 1FCC | Positive Bank Resynchronization |
| STOPCN | 1FD0 | Stop Negative Counter |
| STOPCP | 1FD4 | Stop Positive Counter |
| NRESYNC | 1FD8 | Negative Bank Resynchronization |
| CHKCTR | 1FDC | Address to check counter/Sync status |
| PCTRMSB | 1FE0 | Positive Counter Most Significant Byte |
| PCTRLSB | 1FE4 | Positive Counter Least Significant Byte |
| NCTRMSB | 1FE8 | Negative Counter Most Significant Byte |
| NCTRLSB | 1FEC | Negative Counter Least Significant Byte |
| ARMN | 1FF0 | Arm Negative Counter |
| NSTART | 1FF4 | Start Negative Counter |
| ARMP | 1FF8 | Arm Positive Counter |

TABLE III-continued

| Signal | Address (HEX) | Purpose |
| --- | --- | --- |
| PSTART | 1FFC | Start Positive Counter |

TABLE IV

MAIN Routine

1. Dummy reads of PIA to signal start of routine and clear any effects of spurious signals
2. Ensure counters are stopped
3. Check top of Queue; if not empty, get value and load it into counter; start counter
4. Get Timing Pulse (TP)
5. Check Interval Queue
   a. if INT2 has a value, transfer it to INT1
   b. if INT1 has a value, set XFLAG
6. Advance Queue: Q2 into Q1, Q3 into Q2, clear Q3
7. Get Delay Count (DC) from PIA (68000)
8. If DC > TP, Goto 9.
   Else If Q1 is empty, load DC into Q1
   Else load (DC-Q1) into INT1
9. If (DC-TP) > TP, Goto 10
   Else If Q2 is empty, load DC into Q2
   Else load (DC-TP-Q2) into INT2
   Goto 11
10. Load (DC-2TP) into Q3
11. Repeat for negative bank values
12. Test for Interval Flags (XFLAG);
    If either flag set, Goto INTRVAL Subroutine
13. Test Sync Flags (XRFLAG);
    If XFLAG = 1, clear XFLAG, trigger Ring-counter RESET via XRESYNC; if XFLAG = 2, decrement XFLAG
14. Test if present pulse is CB pulse, via CHKCTR; if it is CB pulse, Goto SYNC Subroutine (TABLE VI)
15. Do dummy reads of PIA to signal end of routine
16. Return from Interrupt

INTRVAL Subroutine
(entered from Step 12 of MAIN Routine)

1. Test if either XFLAG is set
   If none is set, return to 13. of MAIN Routine
   a. If PFLAG set, Goto 2
   b. If NFLAG set, Goto 3
   c. Goto 1
2. If positive bank counter is busy (via CHKCTR), Goto 1b.
   Else load PINT1 value into counter; start counter;
   Clear PINT1, PFLAG
   Goto 1b.
3. If negative bank counter is busy (via CHKCTR), Goto 1.
   Else load NINT1 value into counter; start counter;
   Clear NINT1, NFLAG
   Goto 1.

TABLE V

Variables and Control Signals used by MAIN Routine (Table IV)

| Variables and Control Signals | Description |
| --- | --- |
| TPLSB, TPMSB | Control signals to the Interface board which place the current values of the Least Significant and Most Significant Bytes, respectively, of the Timing Pulse onto the phase controller data bus. |
| XRESYNC | Control signal which causes the applicable ring counter to be reset at the start of the next timing period. |
| STOPCX | Control signal which stops the applicable counter. |
| CHKCTR | Address of a tri-state buffer which monitors the idle signals from the counters and the CB timing period for synchronization purposes. |
| XCTRLSB, XCTRMSB | Address of applicable counter byte for loading the counters. A curious loading requirement was noted for the counters, that being that the LSB had to be loaded before the MSB. This was a result of the internal architecture of the 74LS193 counters. |
| ARMX | Control signal to enable the applicable down-counter to start automatically on the next timing pulse. This signal was not used in the current version of the device. |
| XSTART | Control signal which immediately starts the applicable counter. |
| XQ1, XQ2 XQ3 | Variable (16-bit) in which the current Delay Angle Count is stored. |
| XINT1 | Variable (16-bit) in which an 'Interval' count that is to be applied during the next pulse is stored. The Interval Mode is flagged to be implemented during the current pulse at the start of the routine whenever this variable is non-zero. |
| XINT2 | Variable (16-bit) in which an 'Interval' count that is to be applied during the next+1 pulse is stored. Whenever this variable is non-zero at the start of the routine, it is transferred to XINT1 for action during the next pulse, and XINT2 being then cleared. |
| XPREV | Variable (16-bit) in which the previous delay count is stored just prior to the current delay count being saved in XMSB. |
| TP | Variable (16-bit) where the Timing Pulse count called by TPMSB and TPLSB is stored. |
| TPLIM | Variable (16-bit) which consists of a reduced value of TP and is utilized as a 'temporary' solution to the problem of counter 'over-run'. |
| XFLAG | Variable (8-bit) used as a flag to indicate that an Interval value is to be processed during the current pulse. This flag is set at start of the routine whenever a non-zero value is detected in XINT1. |
| XRFLAG | Variable (8-bit) used as a flag to indicate that XRESYNC is to be applied to the applicable ring-counter during the current pulse (XRFLAG=1) or during the next pulse (XRFLAG=2). If XRFLAG=2, then it is decremented for application on the next pulse. |

TABLE VI

SYNC Subroutine
(entered from Step 14 of MAIN Routine, TABLE IV)

1. Get present Delay Count (DC)
2. If DC > TP, Goto 3
   Else check for INT1 value
   2a. If INT1=0, load DC into Q1; clear all other variables
   2b. Else check previous DC (XPREV)
   If XPREV > TP, INT1 is valid; set variables accordingly
   Else invalid INT1; clear it and Goto 2a.
   Reset Ring counter, via XRESYNC
   Goto 5.
3. If (DC-TP) > TP, Goto 4.
   Else check for INT2 value
   If INT2=0, load (DC-TP) into Q2; check XPREV;
   If < TP, clear Q1; clear all other unused variables
   Else Goto 5.
   Increment XRFLAG Flag
   Goto 5.
4. Load (DC-2TP) into Q3
   If XPREV < 2TP, clear Q2
   Clear all other unused variables
   Increment XRFLAG Flag twice
   Goto 5.
5. Repeat for negative bank values
6. Return to 15. of MAIN Routine (TABLE IV)

TABLE VII

Main Loop Algorithm

1. Initialize Pointers
2. Clear screen
3. Print Main Menu
4. Wait for Response

TABLE VII-continued

Main Loop Algorithm 5. a. If 'Variable Speed Constant Frequency' (VSCF) selected, Goto 6;
   b. If 'End Program' selected, return to monitor;
   c. Else, Goto 3.
6. Initialize Interrupt Vector
7. Get output frequency via GETOH
8. Get minimum input frequency, via GETIH
9. a. Print first portion of VSCF Menu;
   b. Check FLAG; if=0, print OPERATING if=1, print IDLING;
   c. Print next portion of VSCF Menu;
   d. Get Timing Pulse (TP) count; print it;
   e. Print next portion of VSCF Menu;
   f. Calculate input frequency from TP; print it;
   g. Print next portion of VSCF Menu;
   h. Print output frequency set-point;
   i. Print next portion of VSCF Menu;
   j. Print minimum input frequency set-point;
   k. Print next portion of VSCF Menu;
   l. Calculate counter frequency, print it; and,
   m. Update value of maximum firing delay angle
10. Check for input; if no input, Goto 9.
11. a. If Start chosen (D7=1), then:
    (1) initialize STOP, IRQACK,
    (2) begin start sequence via BEGIN,
    (3) set FLAG, and
    (4) Goto 9;
    b. If Stop chosen (D7=2), then:
    (1) clear FLAG,
    (2) stop cycloconverter system via STOP, and
    (3) Goto 9;
    c. If new output frequency chosen (D7=3), then:
    (1) stop cycloconverter system via STOP,
    (2) get new set-point via GETOH, and
    (3) Goto 9;
    d. If new minimum input frequency chosen (D7=4), then:
    (1) stop cycloconverter system via STOP,
    (2) get new set-point via GETIH, and
    (3) Goto 9;
    e. If return chosen (D7=5), then:
    (1) stop cycloconverter system via STOP, and
    (2) Goto 1;
    f. Else Goto 9.

We claim:

1. A digitallycontrolled cycloconverter system for transforming a multiple-phase input power signal of variable frequency into a single-phase output power signal of a selected lower frequency, the cycloconverter system comprising:

(a) sensor means connected to the input power signal;
(b) comparator means connected to the sensor means for continuously creating from the input power signal a series of voltage differential waveforms, each voltage differential waveform varying with a respective one of the voltage differentials existing between different pairs of the voltage waveforms of the input power signal, the time during which one of the voltage differential waveforms is of greater positive magnitude than the other voltage differential waveforms being defined as the associated timing period of the voltage differential represented by the one of the voltage differential waveforms, the number of timing periods being equal to twice the number of voltage waveforms of the input power signal;
(c) free-running counter means for continuously cycling through a defined count at a rate proportional to the selected frequency of the output power signal;
(d) processing means for calculating during each timing period a firing delay for the following timing period, the calculation of each firing delay utilizing the length of the timing period and a count taken from the free-running counter means; and,
(e) signal gate means for creating the output power signal by passing segments of the voltage differentials existing between voltage waveforms of the input power signal, the signal gate means opening to define the start of each voltage differential segment at a time delayed from the start of the timing period associated with that voltage differential by the firing delay calculated by the processing means during the preceding timing period, the signal gate means closing to define the end of that segment at a time delayed from the start of the timing period associated with the following voltage differential by the following firing delay.

2. A digitally-controlled cycloconverter system for transforming a multiple-phase input power signal of variable frequency into a multiple-phase output power signal of a selected lower frequency, the cycloconverter system comprising:

(a) sensor means connected to the input power signal;
(b) comparator means connected to the sensor means for continuously creating from the input power signal a series of voltage differential waveforms, each voltage differential waveform varying with a respective one of the voltage differentials existing between different pairs of the voltage waveforms of the input power signal, the time during which one of the voltage differential waveforms is of greater positive magnitude than the other voltage differential waveforms being defined as the associated timing period of the voltage differential represented by the one of the voltage differential waveforms, the number of timing periods being equal to twice the number of voltage waveforms of the input power signal;
(c) free-running counter means for continuously cycling through a defined count at a rate proportional to the selected frequency of the output power signal;
(d) processing means for calculating during each timing period a firing delay for the following timing period for each voltage waveform of the output power signal, the calculation of each firing delay utilizing a count taken from the free-running counter means; and,
(e) multiple signal gate means, each signal gate means creating a different voltage waveform of the output power signal by passing segments of the voltage differentials existing between voltage waveforms of the input power signal, each signal gate means opening to define the start of each voltage differential segment at a time delayed from the start of the timing period associated with that voltage differential by the firing delay calculated by the processing means for that output voltage waveform during the preceding timing period, the signal gate means closing to define the end of that segment at a time delayed from the start of the timing period associated with the following voltage differential by the following firing delay.

3. A cycloconverter system as in claim 1 or 2, wherein the input power signal has three voltage waveforms, from which are created six voltage differential waveforms and six associated timing periods.

4. A cycloconverter system as in claim 2, wherein the output power signal has three voltage waveforms.

5. A cycloconverter system as in claim 1 or 2, wherein the signal gate means is comprised of a series of thyristors.

6. A cycloconverter system as in claim 1 or 2, wherein the free-running counter means comprises a first counter and a second counter, the first counter counting the pulses of a system clock and the second counter counting the number of output signals from the first counter, the first counter producing one such output signal each time the first counter concludes a count cycle, the length of each such count cycle being proportional to the selected frequency of the output power signal, and wherein the count utilized for calculating each firing delay is an instantaneous value of the count in the second counter.

7. A cycloconverter system as in claim 1 or 2, wherein after the firing delay a firing pulse is fed from the processing means to two signal gates of the signal gate means through a transformer circuit, the transformer circuit comprising a series of transformers each having two input windings and a single output winding, each firing pulse being passed through two serially-connected input windings, one of those input windings being on a first transformer and the other of those input windings being on a second transformer, the output winding of the first transformer being connected to the trigger input of a first signal gate and the output winding of the second transformer being connected to the trigger input of a second signal gate, the first and second signal gates being thereby simultaneously fired after the same firing delay.

8. A method for transforming a multiple-phase input power signal of variable frequency into a single-phase output power signal of a selected lower frequency, the method comprising the steps of:

(a) continuously sensing the input power signal;

(b) continuously creating from the input power signal a series of voltage differential waveforms, each voltage differential waveform varying with a respective one of the voltage differentials existing between different pairs of the voltage waveforms of the input power signal, the time during which one of the voltage differential waveforms is of greater positive magnitude that the other voltage differential waveforms being defined as the associated timing period of the voltage differential represented by the one of the voltage differential waveforms, the number of timing periods being equal to twice the number of voltage waveforms of the input power signal;

(c) calculating, during each cycle of the input power signal, a maximum firing delay, that delay being equal to 180 degrees divided by the frequency of the input power signal, the input power signal frequency being determined from the length of one of the timing periods of the cycle;

(d) calculating, during each cycle of the input power signal, a maximum firing delay angle, that angle being equal to 270 degrees minus the product obtained by multiplying 180 degrees by the ratio of the frequency of the output power signal to the frequency of the input power signal, the input power signal frequency being determined from the length of one of the timing periods of the cycle;

(e) obtaining, during each timing period, an instantaneous value of a count from a free-running counter cycling continuously between a low value equivalent to 90 degrees and a high value equivalent to 450 degrees;

(f) calculating, during each timing period, an equivalent angular value for each count value obtained during that timing period;

(g) determining, during each timing period, whether the equivalent angular value calculated during that timing period is greater or less than the maximum firing delay angle of the cycle, if greater then calculating a first fraction equal to the quotient obtained by dividing the angular value minus 90 degrees by the maximum firing delay angle minus 90 degrees, if less then calculating a second fraction equal to the quotient obtained by dividing 450 degrees minus the angular value by 450 degrees minus the maximum firing delay angle;

(h) calculating, during each timing period, a firing delay equal to the product of the maximum firing delay of the cycle and the applicable first or second fraction determined during that timing period; and, (i) triggering, during each timing period, a signal gate means for creating the output power signal from segments of the instantaneous voltage differentials existing between voltage waveforms of the input power signal, the signal gate means opening to define the start of each voltage differential segment at a time delayed from the start of the timing period associated with that voltage differential by the firing delay calculated during the preceding timing period, the signal gate means closing to define the end of that segment at a time delayed from the start of the timing period associated with the following voltage differential by the following firing delay.

9. A method for transforming a multiple-phase input power signal of variable frequency into a multiple-phase output power signal of a selected lower frequency, the method comprising the steps of:

(a) continuously sensing the input power signal;

(b) continuously creating from the input power signal a series of voltage differential waveforms, each voltage differential waveform varying with a respective one of the voltage differentials existing between different pairs of the voltage waveforms of the input power signal, the time during which one of the voltage differential waveforms is of greater positive magnitude than the other voltage differential waveforms being defined as the associated timing period of the voltage differential represented by the one of the voltage differential waveforms, the number of timing periods being equal to twice the number of voltage waveforms of the input power signal;

(c) calculating, during each cycle of the input power signal, a maximum firing delay, that delay being equal to 180 degrees divided by the frequency of the input power signal, the input power signal frequency being determined from the length of one of the timing periods of the cycle;

(d) calculating, during each cycle of the input power signal, a maximum firing delay angle, that angle being equal to 270 degrees minus the product obtained by multiplying 180 degrees by the ratio of the frequency of the output power signal to the frequency of the input power signal, the input power signal frequency being determined from the length of one of the timing periods of the cycle;

(e) obtaining, during each timing period, an instantaneous value of a count from a free-running counter cycling continuously between a low value equivalent to 90 degrees and a high value equivalent to 450 degrees;

(f) calculating, during each timing period, for each count value obtained during that timing period an equivalent angular value for each of the voltage waveforms of the output power signal;

(g) determining, during each timing period, for each of the equivalent angular values calculated during that timing period, whether that value is greater or less than the maximum firing delay angle, if greater then calculating a first fraction equal to the quotient obtained by dividing the angular value minus 90 degrees by the maximum firing delay angle minus 90 degrees, if less then calculating a second fraction equal to the quotient obtained by dividing 450 degrees minus the angular value by 450 degrees minus the maximum firing delay angle;

(h) calculating, during each timing period, for each voltage waveform of the output power signal, a firing delay equal to the product of the maximum firing delay of the cycle and the applicable first or second fraction determined during that timing period for the respective output voltage waveform; and, (i) triggering, during each timing period, for each voltage waveform of the output power signal, a signal gate means for creating the output power signal from segments of the instantaneous voltage differentials existing between voltage waveforms of the input power signal, each signal gate means opening to define the start of each voltage differential segment at a time delayed from the start of the timing period associated with that voltage differential by the firing delay calculated for the respective output voltage waveform during the preceding timing period, the signal gate means closing to define the end of that segment at a time delayed from the start of the timing period associated with the following voltage differential by the following firing delay of the respective output voltage waveform.

10. A method as in claim 8 or 9, and comprising the additional step, prior to obtaining the count value from the free-running counter, of dividing the input to the counter by a predetermined factor if the frequency of the input power signal is less than a predetermined minimum value.

11. A method as in claim 8 or 9, wherein the signal gate means is comprised of a series of thyristors.

12. A method as in claim 8 or 9, wherein the input power signal has three voltage waveforms, from which are created six voltage differential waveforms and six associated timing periods.

13. A method as in claim 9, wherein the output power signal has three voltage waveforms.

14. A method as in claim 8 or 9, wherein the counter continuously cycles between a low value of 360 and a high value of 1800.

* * * * *